US012811290B2

(12) United States Patent
Chou et al.

(10) Patent No.: US 12,811,290 B2
(45) Date of Patent: Nov. 24, 2026

(54) ANTENNA DEVICE CONFIGURED FOR MIXED BEAM SCANNING

(71) Applicant: Strong-Wave Radio Technology Inc., Taoyuan City (TW)

(72) Inventors: Hsi Tseng Chou, Taoyuan City (TW); Zhi Da Yan, Taoyuan City (TW); Chien Hsin An, Taoyuan City (TW); Siddhartha Panigrahi, Taoyuan City (TW)

(73) Assignee: Strong-Wave Radio Technology Inc., Taoyuan City (TW)

( * ) Notice: Subject to any disclaimer, the term of this patent is extended or adjusted under 35 U.S.C. 154(b) by 133 days.

(21) Appl. No.: 18/773,603

(22) Filed: Jul. 16, 2024

(65) Prior Publication Data

US 2025/0038402 A1 Jan. 30, 2025

Related U.S. Application Data

(60) Provisional application No. 63/529,356, filed on Jul. 27, 2023.

(30) Foreign Application Priority Data

Oct. 24, 2023 (TW) ................................ 112140599

(51) Int. Cl.
*H01Q 3/04* (2006.01)
*H01Q 3/00* (2006.01)
*H01Q 15/02* (2006.01)

(52) U.S. Cl.
CPC ............ *H01Q 3/005* (2013.01); *H01Q 15/02* (2013.01)

(58) Field of Classification Search
CPC ...... H01Q 3/005; H01Q 15/02; H01Q 21/065; H01Q 3/245; H01Q 3/2658; H01Q 15/04;
(Continued)

(56) References Cited

U.S. PATENT DOCUMENTS 6,034,634 A 3/2000 Karlsson
6,310,582 B1 10/2001 Uetake
(Continued)

FOREIGN PATENT DOCUMENTS

CN 111869003 A 10/2020
CN 113794506 A 12/2021
(Continued)

OTHER PUBLICATIONS

European Patent Office, "Partial European Search Report and Search Opinion on European Patent Application No. EP24189829.5", Nov. 20, 2024, 16 pages, European Patent Office, Munich, Germany.
(Continued)

*Primary Examiner* — David E Lotter

(57) ABSTRACT

An antenna device for mixed beam scanning includes at least one antenna module, a plurality of active radio-frequency modules and a rotating portion. The antenna module can perform electronic scanning in a one-dimensional direction. Each of the active radio-frequency modules can enable the antenna module to form a radiation beam. The rotating portion can drive the antenna module to spin or revolve to compensate or enhance the scanning capacity of the antenna module in another dimension. Accordingly, the antenna device is capable both of electronic scanning and mechanical scanning to meet the needs for tracking different satellites and have a good scanning range of coverage while simplifying the overall structural design.

25 Claims, 18 Drawing Sheets

(58) Field of Classification Search
CPC ...... H01Q 19/062; H01Q 21/28; H01Q 15/08; H01Q 3/08; H01Q 3/30; H01Q 3/04; H01Q 3/02; H01Q 1/12; H01Q 1/36; H01Q 3/26; H01Q 21/00; H01Q 23/00
See application file for complete search history.

(56) References Cited

U.S. PATENT DOCUMENTS

| | | | | |
|---|---|---|---|---|
| 11,552,405 | B1 | 1/2023 | Bily | |
| 2002/0167449 | A1* | 11/2002 | Frazita | H01Q 21/064 343/756 |
| 2018/0254564 | A1 | 9/2018 | Corman | |
| 2019/0393598 | A1* | 12/2019 | Logothetis | H01Q 3/08 |
| 2021/0359421 | A1* | 11/2021 | Feng | H01Q 1/241 |
| 2021/0389454 | A1 | 12/2021 | Gao | |
| 2023/0095788 | A1 | 3/2023 | Wang | |

FOREIGN PATENT DOCUMENTS

| | | | |
|---|---|---|---|
| DE | 1107298 | B | 5/1961 |
| KR | 101246366 | B1 | 3/2013 |

OTHER PUBLICATIONS

European Patent Office, "Extended European Search Report and Search Opinion on European Patent Application No. EP24189829. 5", Feb. 20, 2025, 17 pages, European Patent Office, Munich, Germany.

* cited by examiner

ANTENNA DEVICE CONFIGURED FOR MIXED BEAM SCANNING

CROSS-REFERENCE TO RELATED PATENT APPLICATION

This application claims the benefit of U.S. Provisional Application No. 63/529,356, filed Jul. 27, 2023; and claims priority to and the benefit of, under 35 U.S.C. § 119 (a), Taiwan Patent Application No. 112140599, filed Oct. 24, 2023 in Taiwan. The entire content of the above identified applications is incorporated herein by reference.

FIELD

The present disclosure relates to an antenna device, and more particularly to an antenna device capable both of electronic scanning and mechanical scanning, using electronic scanning to perform one-dimensional beam tracking and mechanical scanning for beam tracking in another dimension, so as to meet the needs of tracking different satellites.

BACKGROUND

If the Earth stood still, all the artificial satellites (hereinafter referred to as satellites for short) would be moving in practically coplanar circular or elliptical orbits to satisfy the laws of motion, or more particularly to achieve balance between centripetal forces and centrifugal forces. This orbit plane is symmetric with respect to the equatorial plane of the Earth and may rotate from the Antarctic side toward the Arctic side either counterclockwise or clockwise. In each orbit, there are a plurality of satellites that sequentially revolve around the Earth and that, in the optimal condition, are distributed at equal intervals along the orbit, i.e., are equally angularly spaced along a 360-degree path.

In order to maintain a communication link with chosen satellites, a ground antenna system must have a directive beam that can move rapidly from one satellite to another in order to keep tracking the movements of the satellites. Such a tracking action is critical to ensuring a sustained communication link. The existing tracking methods of antennas use a motor-driven pan head for rotation, as is typically the case with dish antennas. The pan head has at least two motor-driven rotation shafts, respectively tracking the satellite movement on the same orbit plane. While such methods advantageously feature a lower cost, structural simplicity, relatively few issues with heat dissipation, and technical maturity, etc., mechanical scanning is carried out slowly, and communication may be cut off as a result, not to mention the large amount of space required and that the cost is still not low enough. Moreover, mechanical scanning has limited scanning directions and does not allow the beam position to be restored rapidly. Therefore, when it comes to low-Earth-orbit (LEO) satellites, the demand for which has increased significantly in recent years, it is obvious that the foregoing tracking methods leave much to be desired.

Unlike the aforesaid tracking technique that relies entirely on mechanical movement, the active array antenna technique provides a solution to rapid beam tracking. Such an array antenna includes a large number of antenna units, with a radio-frequency (RF) module provided at the back end of each antenna unit. An active array antenna uses an electronic beam-forming mechanism that allows the beam direction to be changed at an extremely high speed, or within a time on the order of milliseconds, which makes it suitable to track LEO satellites with an active array antenna. This technique, however, is disadvantaged by its circuit complexity, a high cost, the required use of a multi-layer substrate, the high complexity of system control and of the manufacturing process, and so on. One of the issues to be addressed in the present disclosure is to provide a desirable antenna structure that can solve the aforementioned problems effectively.

SUMMARY

As the current antenna devices adopting electronic scanning and the current antenna devices adopting mechanical scanning respectively have their advantages and disadvantages, to stand out in a competitive market, based on years of practical experience in professional antenna design and the research sprit striving for excellence, and as a result of longtime research and experiments, an antenna device configured for mixed beam scanning are provided in the present disclosure, which provides users with better user experience.

Certain aspects of the present disclosure are directed to an antenna device for mixed beam scanning. The includes at least one antenna module, a plurality of active RF modules and a rotating portion. The at least one antenna module is configured to perform electronic scanning in a one-dimensional direction, and includes a plurality of antenna unit groups arranged along a first direction. Each of the plurality of antenna unit groups includes at least one antenna unit. The at least one antenna unit of the same antenna unit group is arranged along a second direction. The plurality of active RF modules are electrically connected to the plurality of antenna unit groups, respectively. Each of the plurality of active RF modules is configured to generate an active RF signal and transmit the active RF signal to a corresponding one of the plurality of antenna unit groups, so that the corresponding antenna unit group forms a radiation beam based on the active RF signal. Each of the plurality of antenna unit groups is configured to receive at least one external RF signal and transmit the at least one external RF signal to a corresponding one of the plurality of active RF modules. The rotating portion has one end directly or indirectly connected to the at least one antenna module and is configured to drive the at least one antenna module to spin or revolve around the end of the rotating portion to compensate or enhance a scanning capacity of the at least one antenna module in another dimension. Accordingly, the antenna device is capable both of electronic scanning and mechanical scanning to meet the needs for tracking different satellites and have a good scanning range of coverage while simplifying the overall structural design.

In certain embodiments, the rotating portion is configured to drive the at least one antenna module to rotate alternate between clockwise rotation and counterclockwise rotation.

In certain embodiments, the antenna device further includes a position adjusting portion having a first end directly or indirectly connected to the at least one antenna module and a second end directly or indirectly connected to the rotating portion. The position adjusting portion is configured to tilt the at least one antenna module around an axis defined by the first end of the position adjusting portion to enhance a scanning ability of the at least one antenna module in a one-dimensional direction.

In certain embodiments, the antenna device further includes at least one lateral lens module and at least one ground communication antenna module. The at least one lateral lens module is located between the at least one antenna module and the rotating portion. The at least one ground communication antenna module is located on a lateral side of the at least one lateral lens module and configured to emit at least one RF signal toward the at least one lateral lens module so that the at least one lateral lens module forms a lateral radiation beam.

In certain embodiments, a metal layer is disposed between the at least one lateral lens module and the at least one antenna module or between each two adjacent ones of a stack of lateral lens modules.

In certain embodiments, the ground communication antenna module uses WIFI, 4G or 5G communication protocol.

In certain embodiments, the ground communication antenna module is in a form of a horn antenna or a microstrip antenna.

In certain embodiments, the antenna device further includes a multiple-sided carrier frame and a pivoting portion. The multiple-sided carrier frame has a plurality of structural planes. Each of the plurality of structural planes is positioned with respect to a central axis in a configuration that the plurality of structural planes are distributed around the central axis. The at least one antenna module includes a plurality of antenna modules, and each of the plurality of structural planes is configured to allow a corresponding one of the plurality of antenna modules to be mounted thereon. The pivoting portion has a first end disposed at a lateral side of the multiple-sided carrier frame, and a second end directly or indirectly connected to the end of the rotating portion. The multiple-sided carrier frame is configured to spin around an axis defined by the first end of the pivoting portion. The first end of the pivoting portion extends along a first extending direction, the end of the rotating portion extends along a second extending direction, and the second extending direction is substantially perpendicular to the first extending direction, so that a rotating direction of the antenna module driven by the rotating portion is different from a spinning direction of the multiple-sided carrier frame.

In certain embodiments, the antenna device further includes a plurality of transmitting-end multi-way switches and a plurality of receiving-end multi-way switches. Each of the plurality of transmitting-end multi-way switches is electrically connected to antenna unit groups on different ones of the plurality of structural planes and to one of the plurality of active RF modules. Antenna unit groups on the same one of the plurality of structural planes are not electrically connected to the same one of the plurality of transmitting-end multi-way switches. Each of the plurality of receiving-end multi-way switches is electrically connected to antenna unit groups on different ones of the plurality of structural planes and to one of the plurality of active RF modules. Antenna unit groups on the same one of the plurality of structural planes are not electrically connected to the same one of the plurality of receiving-end multi-way switches.

In certain embodiments, the multiple-sided carrier frame has three structural planes and forms a three-sided structure, and the three-sided structure has a triangular shape in a side view.

In certain embodiments, each two adjacent ones of the three structural planes form a 60-degree angle therebetween.

In certain embodiments, the antenna device further includes a plurality of focusing lens modules. Each of the plurality of focusing lens modules is located outside the multiple-sided carrier frame, corresponds to one of the plurality of antenna modules and is configured to focus a radiation beam generated by the antenna module.

In certain embodiments, each of the plurality of antenna unit groups includes a plurality of antenna units electrically connected to a transmitting-end focus-shifting switch and to a receiving-end focus-shifting switch. The transmitting-end focus-shifting switch is electrically connected to one of the plurality of active RF modules, and the receiving-end focus-shifting switch is electrically connected to one of the plurality of active RF modules.

In certain embodiments, each of the plurality of active RF modules includes a transmitting-end beam-forming integrated circuit (BFIC), a power amplifier, a low-noise amplifier and a receiving-end BFIC. The transmitting-end BFIC is configured to generate an active RF signal. The power amplifier is electrically connected to the transmitting-end BFIC and configured to receive the active RF signal from the transmitting-end BFIC, amplify a power of the active RF signal received from the transmitting-end BFIC, and directly or indirectly transmit the amplified active RF signal to the corresponding antenna unit group. The low-noise amplifier is configured to directly or indirectly receive at least one external RF signal transmitted by the corresponding antenna unit group and amplify the at least one external RF signal. The receiving-end BFIC is electrically connected to the low-noise amplifier and configured to receive the amplified at least one external RF signal.

In certain embodiments, each of the plurality of antenna unit groups includes a plurality of antenna units, a power divider and a power combiner. The power divider is electrically connected to the power amplifier and the plurality of antenna units, and configured to distribute the amplified active RF signal among the plurality of antenna units. The power combiner is electrically connected to the low-noise amplifier and the plurality of antenna units, and configured to combine external RF signals sent by the plurality of antenna units.

In certain embodiments, the at least one antenna module is divided into a first satellite area and a second satellite area. Each antenna unit group in the first satellite area is connected to a higher-power power amplifier, each antenna unit group in the second satellite area is connected to a lower-power power amplifier, and a power level the higher-power power amplifier is configured to amplify to is higher than a power level the lower-power power amplifier is configured to amplify to.

Certain aspects of the present disclosure are directed to a multiple-sided antenna device for mixed beam scanning. The multiple-sided antenna device includes a multiple-sided carrier frame, a plurality of antenna modules, a plurality of active RF modules, a pivoting portion and a rotating portion. The multiple-sided carrier frame has a plurality of structural planes. Each of the plurality of structural planes is positioned with respect to a central axis in a configuration that the plurality of structural planes are distributed around the central axis. Each of the plurality of antenna modules is configured to be mounted on and exposed from a corresponding one of the plurality of structural planes, and performs electronic scanning in a one-dimensional direction. Each of the plurality of active RF modules is electrically connected to the plurality of antenna modules, and configured to generate an active RF signal and transmit the active RF signal to a corresponding one of the plurality of antenna modules, so that the antenna module forms a radiation beam based on the active RF signal. Each of the plurality of antenna modules is configured to receive at least one external RF signal and transmit the at least one external RF signal to a corresponding one of the plurality of active RF modules. The pivoting portion has a first end disposed at a lateral side of the multiple-sided carrier frame and extending along a first extending direction. The multiple-sided carrier frame is configured to spin around an axis defined by the first end of the pivoting portion. The rotating portion has an end directly or indirectly connected to a second end of the pivoting portion, extending along a second extending direction substantially perpendicular to the first extending direction, and configured to drive the multiple-sided carrier frame to spin or revolve around an axis of the rotating portion to compensate or enhance a scanning capacity of the plurality of antenna modules in another dimension, and drive the plurality of antenna modules to rotate as a whole along a rotating direction different from a spinning direction of the multiple-sided carrier frame.

In certain embodiments, in the multiple-sided antenna device, each of the plurality of antenna modules includes a plurality of antenna unit groups arranged along a first direction, and each of the plurality of antenna unit groups is electrically connected to a corresponding one of the plurality of active RF modules and includes at least one antenna unit. The at least one antenna unit of the same antenna unit group is arranged along a second direction.

In certain embodiments, the multiple-sided antenna device further includes a plurality of transmitting-end multi-way switches and a plurality of receiving-end multi-way switches. Each of the plurality of transmitting-end multi-way switches is electrically connected to antenna unit groups on different ones of the plurality of structural planes and to one of the plurality of active RF modules. Antenna unit groups on the same one of the plurality of structural planes are not electrically connected to the same one of the plurality of transmitting-end multi-way switches. Each of the plurality of receiving-end multi-way switches is electrically connected to antenna unit groups on different ones of the plurality of structural planes and to one of the plurality of active RF modules. Antenna unit groups on the same one of the plurality of structural planes are not electrically connected to the same one of the plurality of receiving-end multi-way switches.

In certain embodiments, in the multiple-sided antenna device, the multiple-sided carrier frame has three structural planes and forms a three-sided structure, and the three-sided structure has a triangular shape in a side view.

In certain embodiments, in the multiple-sided antenna device, each two adjacent ones of the three structural planes form a 60-degree angle therebetween.

In certain embodiments, the multiple-sided antenna device further includes a plurality of focusing lens modules. Each of the plurality of focusing lens modules is located outside the multiple-sided carrier frame, corresponding to one of the plurality of antenna modules and configured to focus the radiation beam generated by the antenna module corresponding to the focusing lens module.

In certain embodiments, in the multiple-sided antenna device, each of the plurality of antenna modules includes a plurality of antenna unit groups arranged along a first direction, each of the plurality of antenna unit groups is electrically connected to a corresponding one of the plurality of active RF modules, and includes a plurality of antenna units arranged along a second direction and electrically connected to a transmitting-end focus-shifting switch and to a receiving-end focus-shifting switch, the transmitting-end focus-shifting switch is electrically connected to one of the plurality of active RF modules, and the receiving-end focus-shifting switch is electrically connected to one of the plurality of active RF modules.

In certain embodiments, in the multiple-sided antenna device, each of the plurality of active RF modules includes a transmitting-end BFIC, a power amplifier, a low-noise amplifier and a receiving-end BFIC. The transmitting-end BFIC is configured to generate an active RF signal. The power amplifier is electrically connected to the transmitting-end BFIC and configured to receive the active RF signal from the transmitting-end BFIC, amplify a power of the active RF signal received from the transmitting-end BFIC, and directly or indirectly transmit the amplified active RF signal to a corresponding one of the plurality of antenna unit groups. The low-noise amplifier is configured to directly or indirectly receive at least one external RF signal transmitted by the corresponding antenna unit group and amplify the at least one external RF signal. The receiving-end BFIC is electrically connected to the low-noise amplifier and configured to receive the amplified at least one external RF signal.

In certain embodiments, in the multiple-sided antenna device, each of the plurality of antenna unit groups includes a plurality of antenna units, a power divider and a power combiner. The power divider is electrically connected to the power amplifier and the plurality of antenna units and configured to distribute the amplified active RF signal among the plurality of antenna units. The power combiner is electrically connected to the low-noise amplifier and the plurality of antenna units and configured to combine external RF signals sent by the plurality of antenna units.

This and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
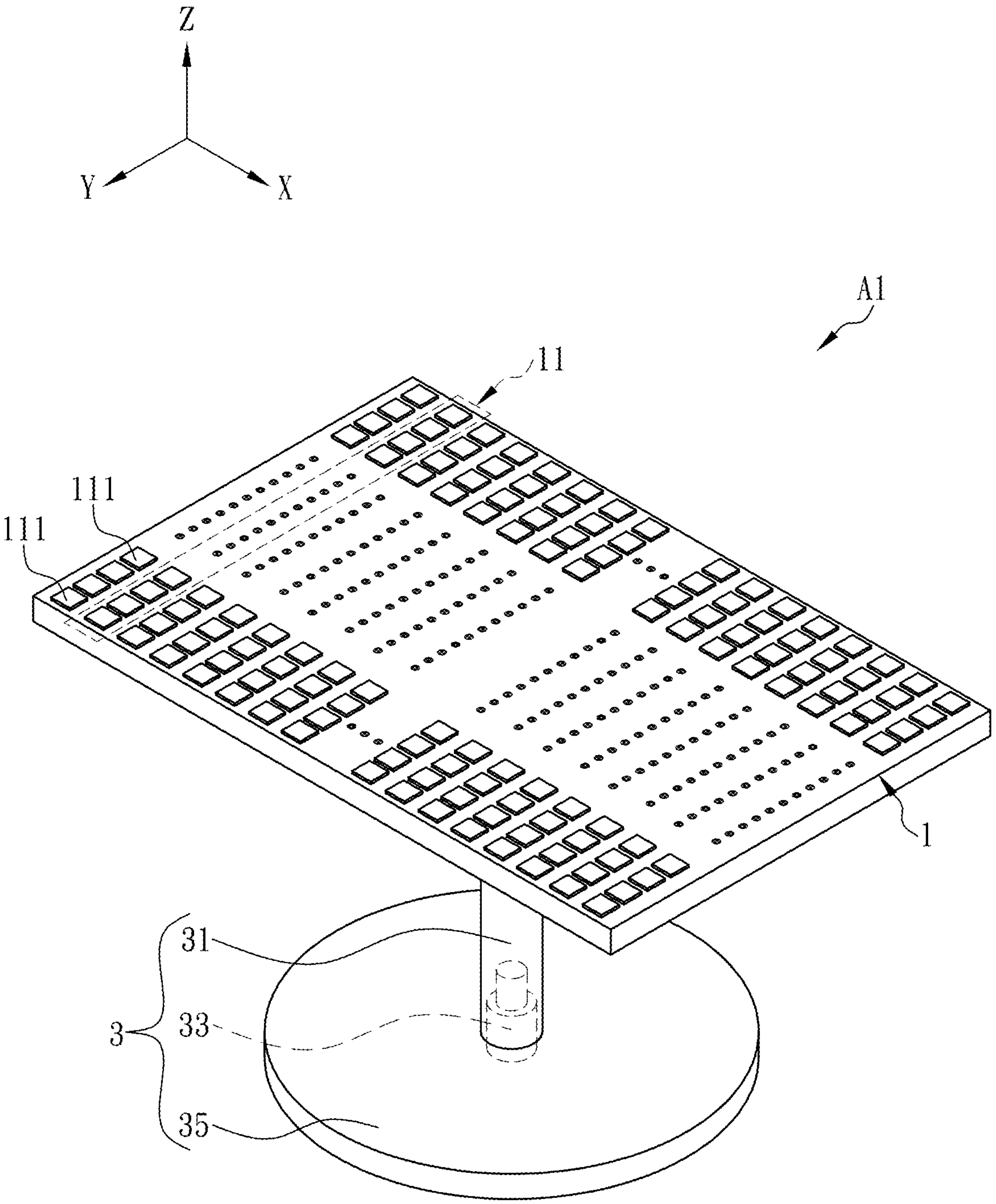
FIG. 1 is a perspective view of an antenna device according to certain embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the term "and/or" includes any and all combinations of one or more of the associated listed items. Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

As used herein, a numeral value referred in the present disclosure can include a value, or an average of values, in an acceptable deviation range of a particular value recognized or decided by a person of ordinary skill in the art, taking into account any specific quantity of errors related to the measurement of the value that may resulted from limitations of a measurement system or device. For example, a particular numeral value referred in the embodiments of the present disclosure can include ±5%, ±3%, ±1%, ±0.5% or ±0.1%, or one or more standard deviations, of the particular numeral value.

The term "connected" or "electrically connected" as may be referred to in the present disclosure includes connection configurations such as direct connection between two components, indirection connection between two components with at least one component being provided between the two components, etc.

Certain aspects of the present disclosure are directed to an antenna device configured for mixed beam scanning. To facilitate description, the spatial configuration as used in the present disclosure is defined by three axes that are perpendicular to one another, namely a transverse axis (the X axis), a longitudinal axis (the Y axis), and a vertical axis (the Z axis). An antenna device in the present disclosure is capable of both electronic scanning (electronic tracking) and mechanical scanning (mechanical tracking) in order to achieve a mechanism for tracking satellites (e.g., LEO satellites). For instance, the antenna device can perform electronic scanning in one dimension (e.g., a dimension defined by the polar angle theta (θ)) so as to carry out rapid tracking and rapid beam position restoration, and mechanical scanning in another dimension (e.g., a dimension defined by the azimuthal angle phi (φ)) so as to establish a communication link to a satellite by tracking it at a lower speed.

Figure 2:
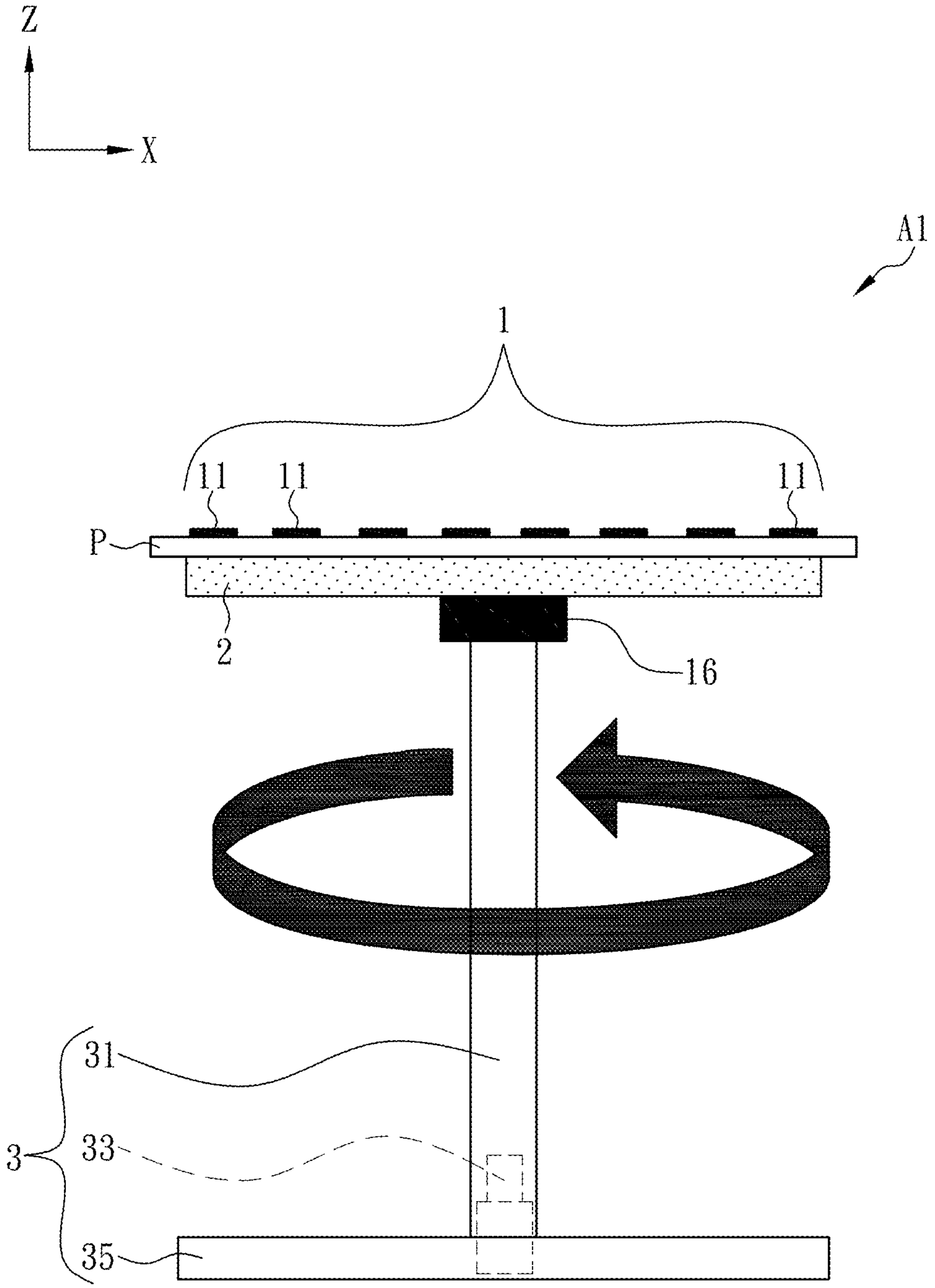
FIG. 2 is a side view of the antenna device according to certain embodiments of the present disclosure.
Figure 3:
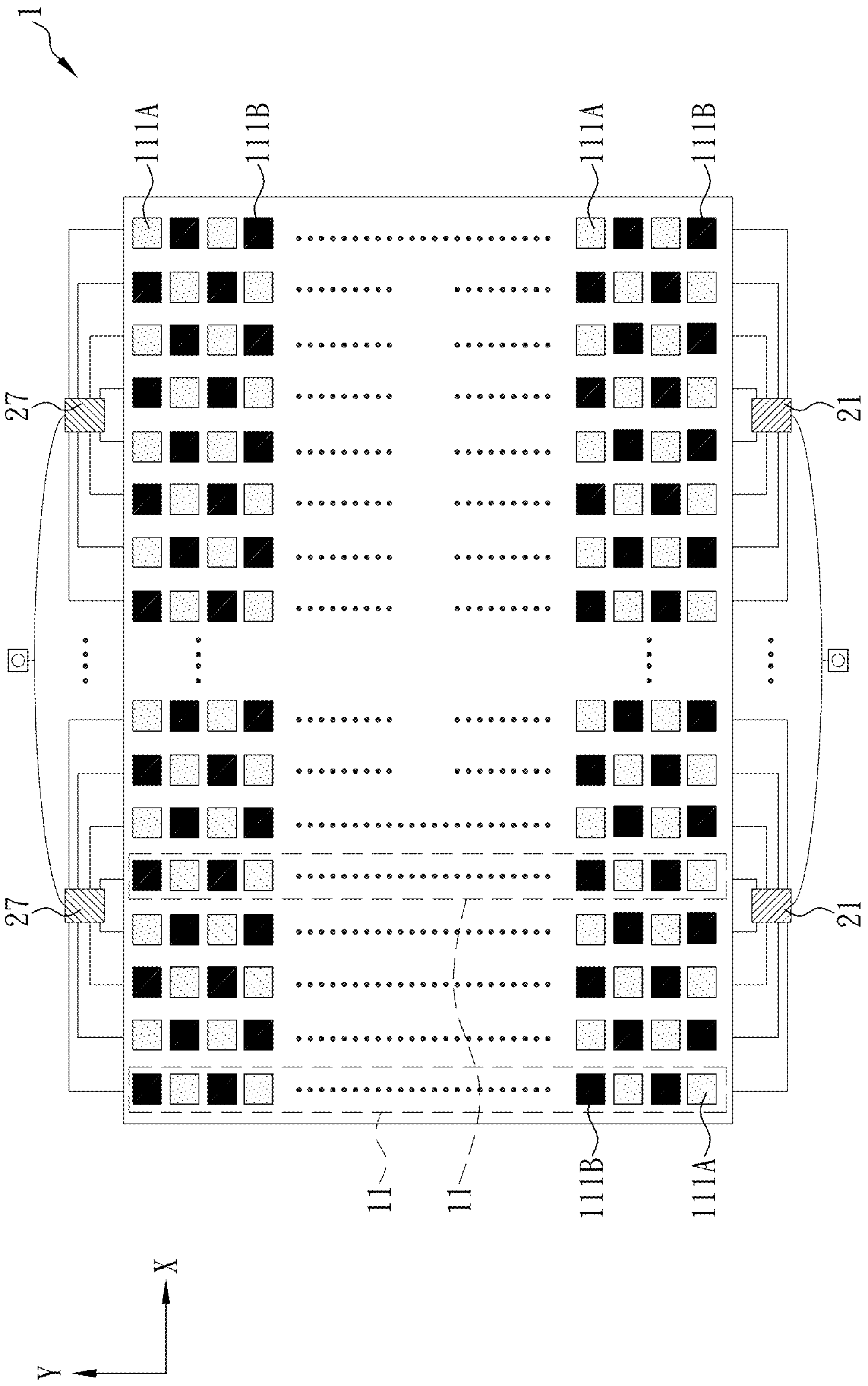
FIG. 3 is a schematic diagram of the antenna unit configuration of an antenna module according to certain embodiments of the present disclosure.

Referring to FIG. 1 to FIG. 3, in certain embodiments, an antenna device A1 includes an antenna module 1, a plurality of active RF modules 2, and a rotating portion 3. The antenna module 1 is capable of electronic scanning and is in the form of, for example but not limited to, an array antenna. In certain embodiments, the antenna module 1 can be in antenna forms other than an array antenna, as long as the antenna module 1 can perform electronic scanning. When the array antenna has a one-dimensional layout, it can perform electronic scanning in a plane defined by sweeping through a polar angle. When the array antenna has a two-dimensional layout, it can perform electronic scanning in a plane defined by sweeping through an azimuthal angle as well as in a plane defined by sweeping through a polar angle. As the minimum requirement for electronic scanning (i.e., scanning in a single dimension) can be met by a one-dimensional array antenna, the antenna module 1 can be a one-dimensional array antenna constructed by a plurality of high-gain antenna objects to carry out beam scanning in a single dimension.

With continued reference to FIG. 1 to FIG. 3, the antenna module 1 includes a plurality of antenna unit groups 11 (e.g., M antenna unit groups 11). The antenna unit groups 11 are configured to transmit RF signals outward and to receive external RF signals from the outside. The antenna unit groups 11 are arranged substantially along a first direction (e.g., the X-axis direction in FIG. 1), and each antenna unit group 11 includes a plurality of antenna units 111 (e.g., N antenna units 111) that are arranged substantially along a second direction (e.g., the Y-axis direction in FIG. 1). In certain embodiments, however, an antenna unit group 11 can include only one antenna unit 111 (i.e., N=1). Each antenna unit group 11 can be electrically connected to an active RF module 2 to receive the active RF signal transmitted from the active RF module 2 and form the corresponding radiation beam, or to transmit the received external RF signals to the active RF module 2.

It should be pointed out that each active RF module 2 is mainly a beam-forming integrated circuit (BFIC) for controlling the phase and amplitude of the active RF signal transmitted by the corresponding antenna element of an array antenna and thereby forming a beam in a particular direction. Accordingly, FIG. 3 presents the configuration of the antenna unit groups 11 being electrically connected to a plurality of BFICs (which include transmitting-end BFICs 21 and receiving-end BFICs 27), and certain electronic elements are left out in the drawing for brevity. Depending on actual product requirements (e.g., the requirement for full-duplex operations, or considerations of cost or space), the same BFIC can serve both transmitting and receiving purposes without utilizing BFICs designed specifically for transmitting purposes or receiving purposes. In other words, in certain embodiments, each antenna unit group 11 can be connected to a single BFIC rather than to a transmitting-end BFIC 21 and a receiving-end BFIC 27.

Referring to FIG. 1 to FIG. 4, when each antenna unit group 11 has a plurality of antenna units 111, each antenna unit group 11 may be provided with a power divider 13 for distributing an active RF signal evenly among the antenna units 111 and a power combiner 15 for combining the external RF signals received by the antenna units 111. In certain embodiments, each antenna unit group 11 is subjected to passive power distribution by the corresponding power divider 13 in order to form a radiation beam focused in a particular direction (e.g., the front-view (broadside) direction), with the radiation beam having a fan shape, i.e., with the radiation beam having a wide-beam configuration in the first direction (i.e., the direction in which the antenna unit groups 11 are sequentially arranged) and a narrow-beam configuration in the second direction (i.e., the direction in which the antenna units 111 are sequentially arranged), so as to increase the antenna gain.

Referring again to FIG. 1 to FIG. 3, each antenna unit group 11 works with one active RF module 2 and therefore can be viewed as a single antenna element (also referred to as an array element or a subarray) whose performance is equivalent to that of a high-gain antenna object. In other words, although the antenna units 111 of the antenna module 1 are physically arranged in a two-dimensional configuration, the antenna module 1 can be regarded function-wise as having a one-dimensional layout (i.e., with a plurality of high-gain antenna objects arranged one-dimensionally), and this one-dimensional layout enables electronic scanning in a plane defined by sweeping through a polar angle. When the antenna unit groups 11 are arranged on the top side of a circuit board P and face upward (e.g., in the Z-axis direction in FIG. 2), the scanning angle of the antenna unit groups 11 in a plane defined by sweeping through a polar angle is in the range of, for example but not limited to, about ±50-60 degrees (with the Z axis indicating 0 degree). However, the present disclosure is note limited thereto, and the aforesaid scanning angle of the antenna module 1 can be increased to ±75 degrees by increasing the number of the antenna units 111.

In certain embodiments, with continued reference to FIG. 1 to FIG. 3, each antenna units 111 in the same antenna unit group 11 can be a transmitting-end antenna unit 111A or a receiving-end antenna unit 111B, depending on whether the antenna unit is electrically connected to a transmitting-end BFIC 21 or a receiving-end BFIC 27, and the transmitting-end antenna unit(s) 111A and the receiving-end antenna unit(s) 111B are alternately arranged. However, the present disclosure is not limited thereto. In certain embodiments, an antenna unit group 11 can include entirely the transmitting-end antenna unit(s) 111A and no receiving-end antenna unit 111B, or include entirely the receiving-end antenna unit(s) 111B and no transmitting-end antenna unit 111A, or an antenna unit group 11 can have a portion composed entirely of transmitting-end antenna units 111A and another portion composed entirely of receiving-end antenna units 111B, or an antenna unit 111 can be configured for both transmitting and receiving purposes, i.e., an antenna unit 111 that can serve as a receiving-end antenna unit 111B as well as a transmitting-end antenna unit 111A.

The antenna module 1 and the active RF modules 2 in the present disclosure are so designed that the antenna unit groups 11 can form narrower narrow beams. This helps increase the gain of the antenna module 1 so that a desirable range of coverage in a plane defined by sweeping through a polar angle can be attained with an increase in intensity of the received/transmitted RF signals. Besides, although the antenna device A1 in the present disclosure can scan in a plane defined by sweeping through an azimuthal angle by a mechanical mechanism (for example, the rotating portion 3 as described infra), the antenna module 1 in the disclosure can, in certain application scenarios or in response to certain application requirements (e.g., when the mechanical mechanism malfunctions or when it is required to switch between satellites rapidly or to reduce the movement of the mechanical mechanism), carry out additional (or temporary) electronic scanning in a plane defined by sweeping through an azimuthal angle (e.g., by working with one or more additional phase controllers or other devices, additional software, and so on), thereby increasing the flexibility of use. In certain embodiments, the antenna device A1 can further include a position adjusting portion 16, with a first end of the position adjusting portion 16 directly or indirectly connected to the antenna module 1 so that the antenna module 1 can be tilted around an axis defined by the first end of the position adjusting portion 16, thereby enhancing the scanning ability of the antenna module 1 in a one-dimensional direction (e.g., a polar angle direction).

The structure of each active RF module 2 is described infra but is not limited thereto. Depending on actual product requirements, the electronic components of each active RF module 2 or even the connections between the electronic components can be adjusted and changed, as long as the active RF module 2 can enable the antenna module 1 to generate the desired radiation beam(s). Referring to FIG. 1 to FIG. 4, in certain embodiments, each active RF module 2 includes a transmitting-end BFIC 21, a power amplifier 23, a low-noise amplifier 25, and a receiving-end BFIC 27, wherein the transmitting-end BFIC 21 is configured to generate an active RF signal, and has a main function of controlling and adjusting the phase and amplitude of the active RF signal transmitted by the corresponding antenna unit group(s) 11 so that the antenna module 1 can form a radiation beam in the specified direction. In certain embodiments, each active RF module 2 has an independent transmitting-end BFIC 21. In certain embodiments, a plurality of active RF modules 2 can share one transmitting-end BFIC 21 that can provide each of the corresponding antenna unit groups 11 with its corresponding active RF signal.

With continued reference to FIG. 1 to FIG. 4, the power amplifier 23 can be electrically connected to the transmitting-end BFIC 21 in order to receive the active RF signal transmitted by the transmitting-end BFIC 21 and amplify the power of the active RF signal received. In addition, the power amplifier 23 can directly or indirectly transmit the amplified active RF signal to the antenna unit group 11. For example, the power amplifier 23 can transmit the amplified active RF signal to the power divider 13, and the power divider 13 divides the amplified active RF signal into a plurality of divided active RF signals and transmits the divided active RF signals to the antenna units 111, in particular the transmitting-end antenna units 111A, in the same antenna unit group 11 in order for the antenna unit group 11 to form a predetermined radiation beam.

With continued reference to FIG. 1 to FIG. 4, the low-noise amplifier 25 can be electrically connected to the antenna unit group 11 in order to receive, directly or indirectly, the external RF signal(s) transmitted by the antenna unit group 11. For example, when the antenna unit group 11 receives external RF signals, the antenna units 111 (in particular the receiving-end antenna units 111B) of the antenna unit group 11 transmit the external RF signals to the power combiner 15, in order for the power combiner 15 to combine the external RF signals into a combined external RF signal and transmit the combined external RF signal to the low-noise amplifier 25, which in turn amplifies the combined external RF signal to a power level sufficiently high without causing a significant increase in noise of the external RF signal. The receiving-end BFIC 27 can be electrically connected to the low-noise amplifier 25 and is configured to receive the amplified external RF signal and perform relevant processing procedures such as demodulating the external RF signal, optimizing the signal, or transmitting the signal to other circuits for further processing. As with the transmitting-end BFIC 21, each active RF module 2 can have an independent receiving-end BFIC 27, or a plurality of active RF modules 2 can share one receiving-end BFIC 27.

Referring again to FIG. 1 to FIG. 4, it can be known from the above that although the antenna device A1 uses M*N antenna units 111, the antenna units 111 in the same group share one power amplifier 23 and one low-noise amplifier 25. Consequently, the total number of the power amplifiers 23 used in the antenna device A1 is M, and the total number of the low-noise amplifiers 25 used in the antenna device A1 is also M. Compared with the design of a conventional active array antenna (in which M*N power amplifiers 23 and M*N low-noise amplifiers 25 are required), the design of the antenna device A1 in the present disclosure allows an about N-times reduction in cost and reduces the time required for control signal transmission between electronic components by about N times too. This contributes to not only reducing the delay of electronic scanning greatly, but also reducing the heat generated by the antenna device A1 during operation such that the difficulty of designing the heat dissipation structure is lowered.

Referring to FIG. 1 and FIG. 2, the rotating portion 3 has a first end directly or indirectly connected to the antenna module 1 and is configured to drive the antenna module 1 into rotation. For example, the rotating portion 3 can be connected to the circuit board P of the antenna module 1 (which connection is equivalent to direct connection), or to a substrate provided with the active RF modules 2 (which connection is equivalent to indirect connection), or to a second end of the position adjusting portion 16 (which connection is also equivalent to indirect connection) in order to drive the antenna module 1 into rotation. When an extension line (extending in the Z-axis direction) of the axis of the rotating portion 3 extends through the antenna module 1, the antenna module 1 can spin around the axis, and when the extension line of the axis does not extend through the antenna module 1, the antenna module 1 can revolve around the axis. In other words, the antenna module 1 as a whole can rotate around a vertical axis (the Z axis) to supplement or increase the antenna module 1's ability to scan in a plane defined by sweeping through an azimuthal angle.

In certain embodiments, with continued reference to FIG. 1 and FIG. 2, the rotating portion 3 includes a supporting member 31 and a motor 33. The top end of the supporting member 31 can be directly or indirectly connected to the antenna module 1, and the bottom end of the supporting member 31 can be directly or indirectly connected to the motor 33 in order for the motor 33 to drive the supporting member 31 into rotation and thereby spin the antenna module 1 through 360 degrees in the XY plane. In certain embodiments, the motor 33 is provided in a base 35, and the bottom end of the supporting member 31 extends through the base 35 and is directly connected to the driving shaft of the motor 33. In certain embodiments, the bottom end of the supporting member 31 is fixed on the base 35, and the motor 33 can drive the entire base 35 or a portion of the base 35 into rotation in order to rotate the supporting member 31. That is to say, the configuration of the rotating portion 3 can vary, and as long as a rotating portion can drive the entire antenna module 1 into rotation (spinning or revolution), it falls within the scope of the rotating portion 3 as defined in the present disclosure.

Figure 4:
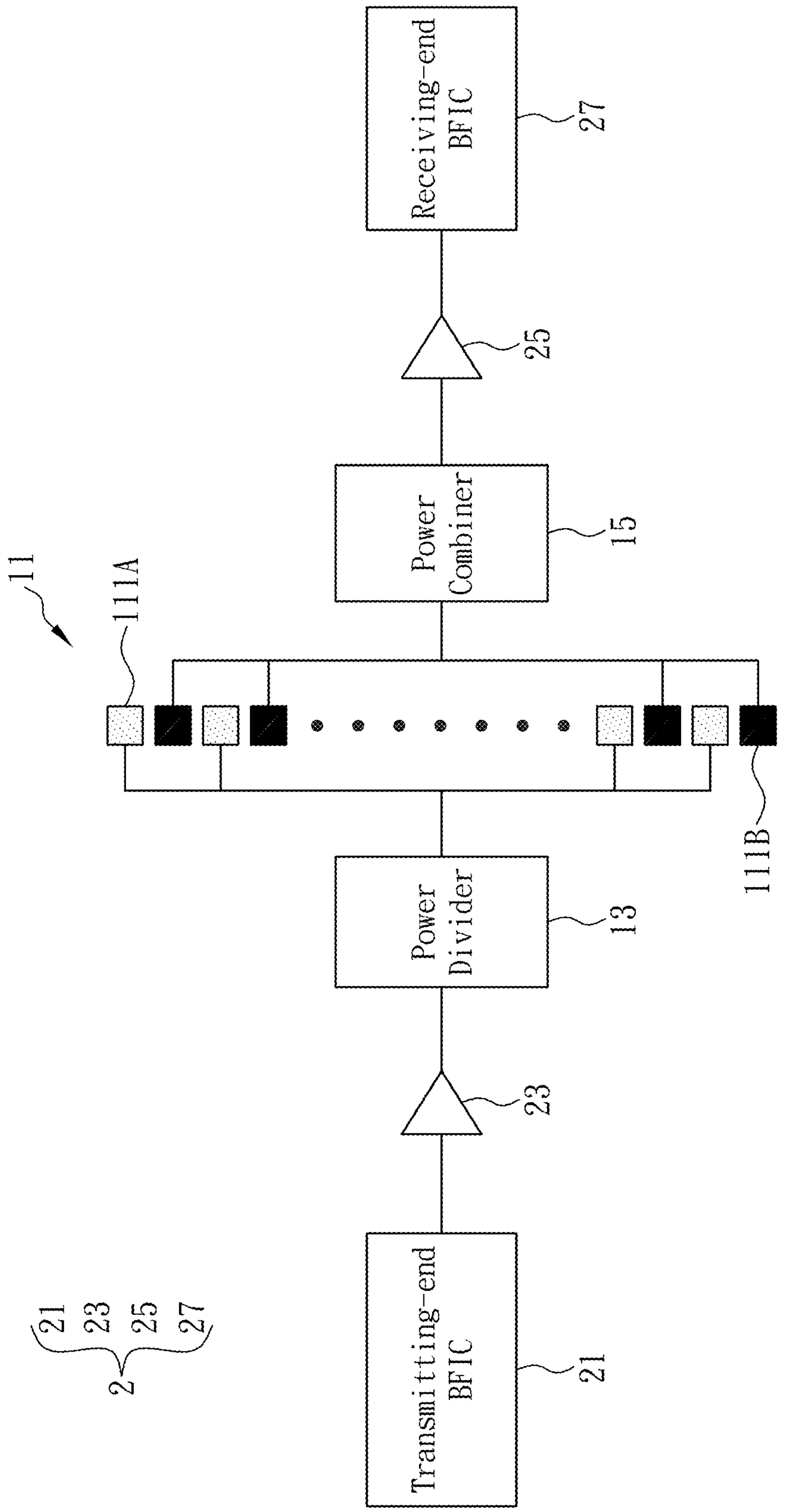
FIG. 4 is a block diagram of the circuitry of an antenna module and an active RF module according to certain embodiments of the present disclosure.
Figure 5:
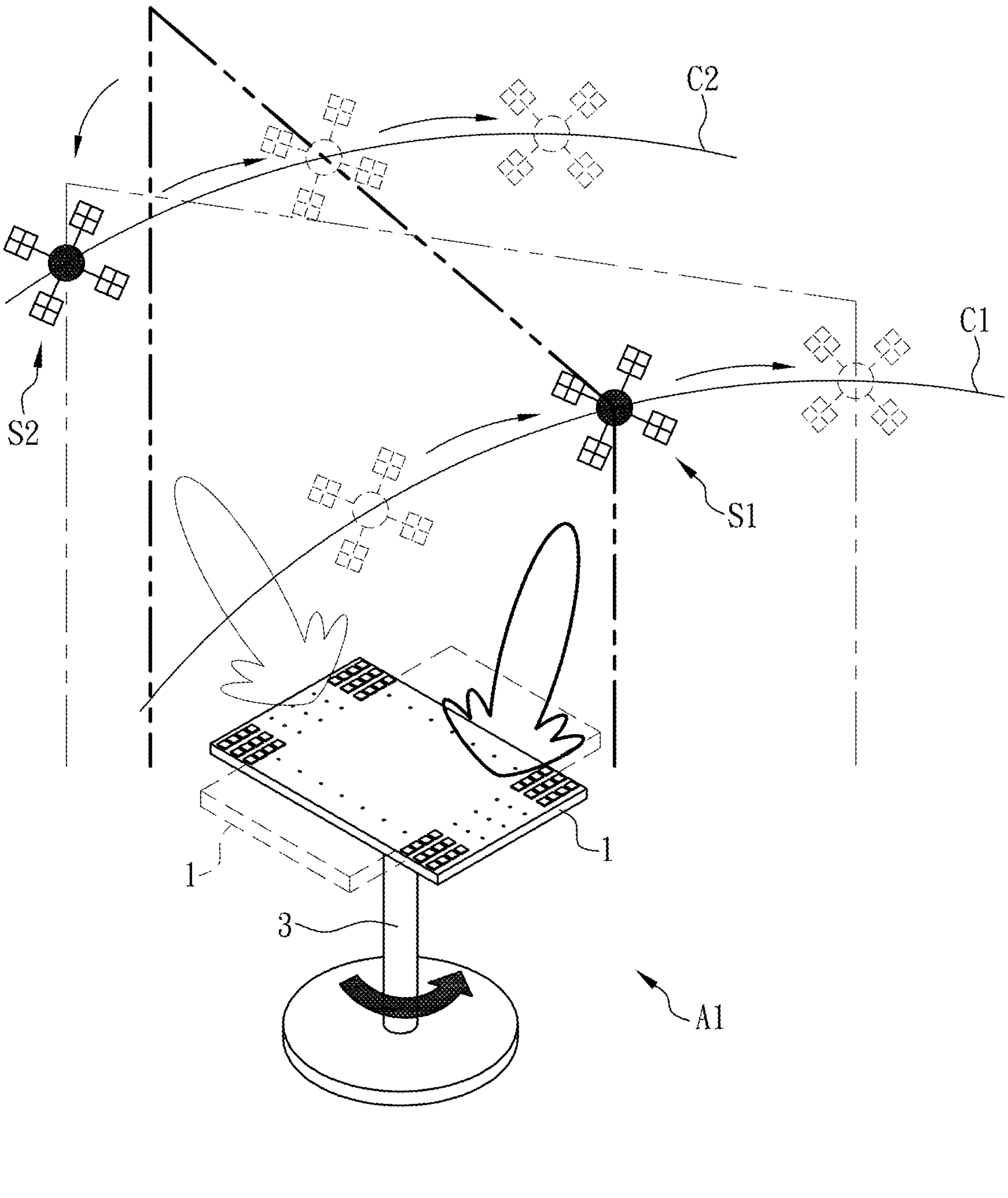
FIG. 5 is a schematic diagram showing the operation of the antenna device according to certain embodiments of the present disclosure.

The way the antenna device A1 tracks satellites is described infra with reference to FIG. 1 to FIG. 5. FIG. 5 shows two satellite orbits C1 and C2. The satellite S1 in the orbit C1 moves from left to right, and so does the satellite S2 in the orbit C2. The antenna module 1 can be rotated and switch beams in order to track the satellite S1 in the orbit C1 and the satellite S2 in the orbit C2. To perform beam scanning in a plane defined by sweeping through a polar angle, the antenna module 1 uses electronic scanning, and to perform beam scanning in a plane defined by sweeping through an azimuthal angle, the antenna module 1 uses mechanical scanning, i.e., with the antenna module 1 rotated by the rotating portion 3 in order to carry out beam scanning in a plane defined by sweeping through an azimuthal angle. The angle through which and the direction in which the antenna module 1 is rotated by the rotating portion 3 can be any angle and direction and are not limited to the 90-degree angle rotation shown in FIG. 5. The antenna module 1 can be rotated in the same clockwise direction or in the same counterclockwise direction, or be rotated alternate between clockwise rotation and counterclockwise rotation as needed, in order to track and search for satellites.

With continued reference to FIG. 1 to FIG. 5, the antenna module 1 forms a scanning plane that extends upward (e.g., the imaginary plane indicated by the bold dash-dot-dot line in FIG. 5). When at a first position, the antenna module 1 is already linked to the satellite S1 in the orbit C1. When the antenna module 1 is rotated from the first position to a second position, the scanning plane is rotated (counterclockwise) along with the antenna module 1. The scanning plane can be divided into a left half plane and a right half plane by the rotation axis of the antenna module 1. During the foregoing rotation process, the left half plane of the scanning plane is rotated to the left (i.e., from the position indicated by the bold dash-dot-dot line to the position indicated by the fine dash-dot-dot line), and the right half plane of the scanning plane is rotated to the right in order to maintain the link to, and keep tracking, the satellite S1 (in FIG. 5, the right half of the plane indicated by the thin dash-dot-dot line is to the right of the right half of the plane indicated by the bold dash-dot-dot line). The satellite S2 in the orbit C2 moves from left to right and therefore will meet the left half plane of the scanning plane, and when they meet, the antenna device A1 can change the direction of the beam that has been used to track the satellite S1, in order to track the satellite S2 in the orbit C2. The antenna device A1 can also change the rotation direction of the scanning plane (from counterclockwise to clockwise) in order to link to and track the satellite S2.

With continued reference to FIG. 1 to FIG. 5, when the beam of the antenna module 1 is locked to the satellite S2, and the left half plane of the scanning plane is moved along with the satellite S2, the right half plane of the scanning plane is rotated in a direction opposite to the direction in which the left half plane is rotated. As a result, the right half plane of the scanning plane meets the orbit C1 again and can be used to search for another satellite in the orbit C1 (i.e., a satellite other than the satellite S1) or a satellite in an orbit that is on the same half plane of the scanning plane as the orbit C1 (the right/left half plane of the scanning plane). In other words, mechanical rotation of the antenna module 1 allows the scanning plane of the antenna module 1 to alternate between clockwise rotation and counterclockwise rotation so that a satellite can be tracked while a search for the next satellite to link to is performed.

According to the above, the antenna device A1 can adopt the form of a circular-polarization antenna or dual-polarization antenna, wherein a dual-polarization antenna allows two differently polarized signals (e.g., a horizontally polarized signal and a vertically polarized signal) to be received at the same time. Moreover, the antenna device A1 is capable of physical rotation, e.g., with the rotating portion 3 driving the antenna module 1 to rotate in a plane defined by sweeping through an azimuthal angle, thus changing the direction of linear polarization too. The antenna module 1, when rotated, can adjust its polarization direction to match the polarization of the incident wave, and back-end signal processing techniques are used to ensure that the polarization of the signal received matches that at the transmitting end. In addition, the antenna device A1 can perform cross-orbit satellite tracking and linking; that is to say, the first satellite being tracked and the second satellite to link to can be in different orbits. This is made possible mainly by the fact that the electronic scanning function of the antenna module 1 allows swift beam switching over a wide angle so that two orbits of interest are not necessarily two adjacent ones but can be two orbits separated by one or more orbits. The antenna device A1, therefore, is more flexible in choosing satellites and has higher communication efficiency. For example, when the communication links to the satellites in the immediately adjacent orbit are saturated, the antenna device A1 can choose to link to a satellite in a farther orbit. Thus, the antenna device A1 in the present disclosure provides an optimized solution for use in cases where satellite orbits are relatively few and far between, in particular for use by small-scale satellite service providers.

The antenna device A1 can be used to track satellites in different kinds of orbits, such as a geostationary-Earth-orbit (GEO) satellite, a medium-Earth-orbit (MEO) satellite, and a low-Earth-orbit (LEO) satellite, each of which has its distinctive properties. A GEO satellite is practically stationary with respect to a ground antenna system, so the antenna system does not have to track the satellite. A GEO satellite calls for high effective isotropic radiated power at the transmitting end (abbreviated as EIPR(TX)) and a high gain-to-noise temperature ratio at the receiving end (abbreviated as G/T(RX)). A LEO satellite moves fast, requires rapid tracking, but calls for lower EIPR(TX) and G/T(RX). The properties of a MEO satellite are somewhere between the properties of a GEO satellite and the properties of a LEO satellite. Therefore, the EIPR(TX) and G/T(RX) of the antenna device A1 will meet the antenna property requirements of a LEO satellite and of a MEO satellite if meeting the antenna requirements of a GEO satellite, and the beam tracking ability of the antenna device A1 will be sufficient to track a MEO satellite and a GEO satellite if sufficient to track a LEO satellite.

Figure 6:
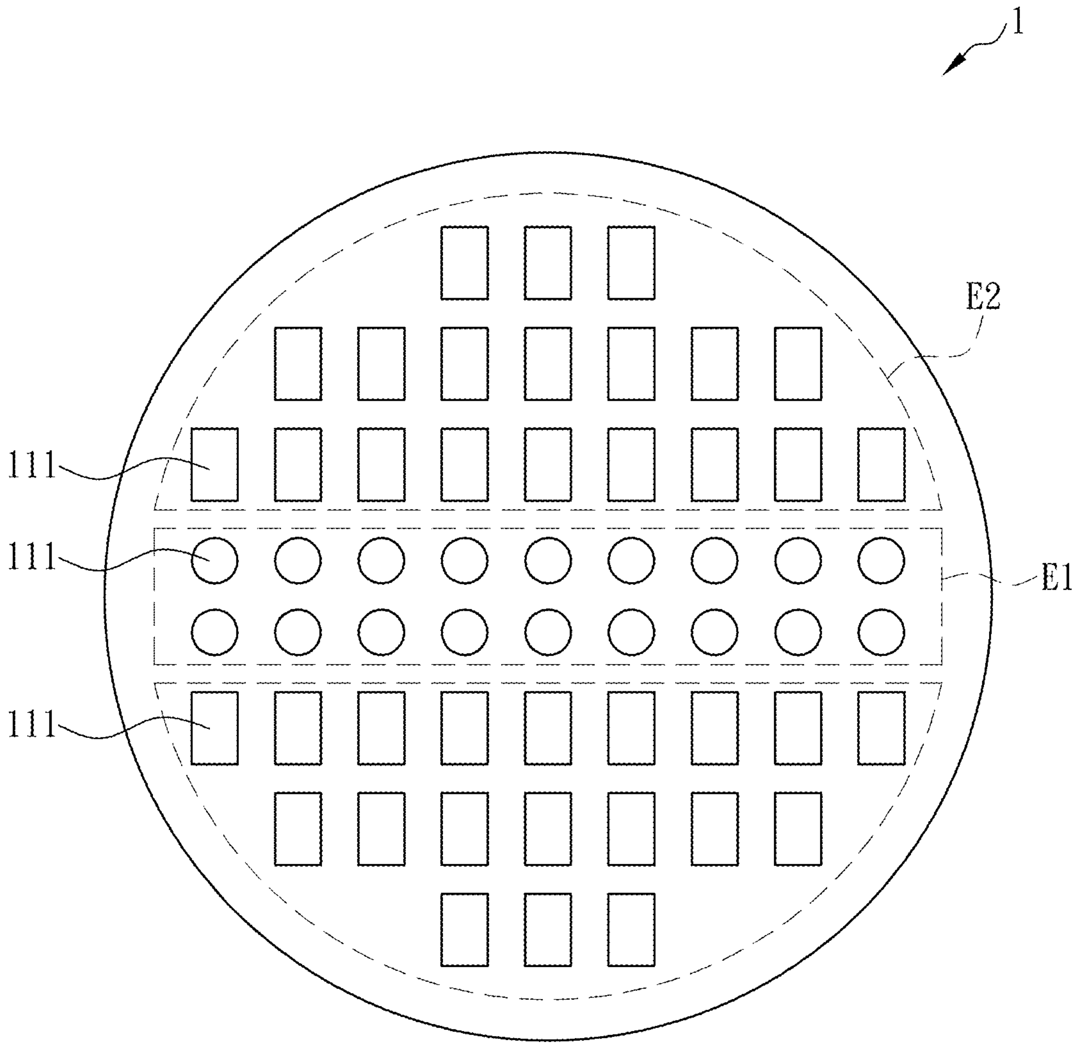
FIG. 6 is a schematic diagram of an antenna module according to certain embodiments of the present disclosure.

In certain embodiments, referring to FIG. 3, FIG. 4 and FIG. 6, the antenna module 1 can be divided into a first satellite area E1 and a second satellite area E2. The arrangement of the antenna units 111 of this antenna module 1 can be the same as or similar to that in certain embodiments described supra (i.e., with a plurality of antenna unit groups 11 arranged in the first direction, and with each antenna unit group 11 having a plurality of antenna units 111), except that the numbers of the antenna units 111 in at least two antenna unit groups 11 can be different from each other. Some of the antenna unit groups 11 are connected to active RF modules 2 that use higher-power power amplifiers 23, and these antenna unit groups 11 constitute the first satellite area E1 and can be configured to work in, for example, the Ku band, the Ka band, and/or the S band. Certain other antenna unit groups 11 are connected to active RF modules 2 that use lower-power power amplifiers 23 (as compared to the power level to which the aforesaid higher-power power amplifiers 23 can amplify), and these antenna unit groups 11 constitute the second satellite area E2 and can be configured to work in, for example, the Ku band and/or the S band. When linked to a LEO satellite, the antenna device A1 can turn off the first satellite area E1 (i.e., does not use the elements of and related to the first satellite area E1), use only the elements of and related to the second satellite area E2, and track the LEO satellite by using a combination of electronic scanning and mechanical scanning as in certain embodiments described supra. Since the elements of and related to the first satellite area E1 are not used, there is no need to worry about heat dissipation from the higher-power power amplifiers 23, and power consumption by the antenna device A1 as a whole is reduced. When linked to a GEO satellite, the antenna device A1 can use both the first satellite area E1 and the second satellite area E2 to stay efficient in power consumption. Since only the first satellite area E1 uses the higher-power power amplifiers 23, the higher-power power amplifiers 23 can be arranged in a smaller area, and this makes it easier to address the issue of heat dissipation.

Figure 7:
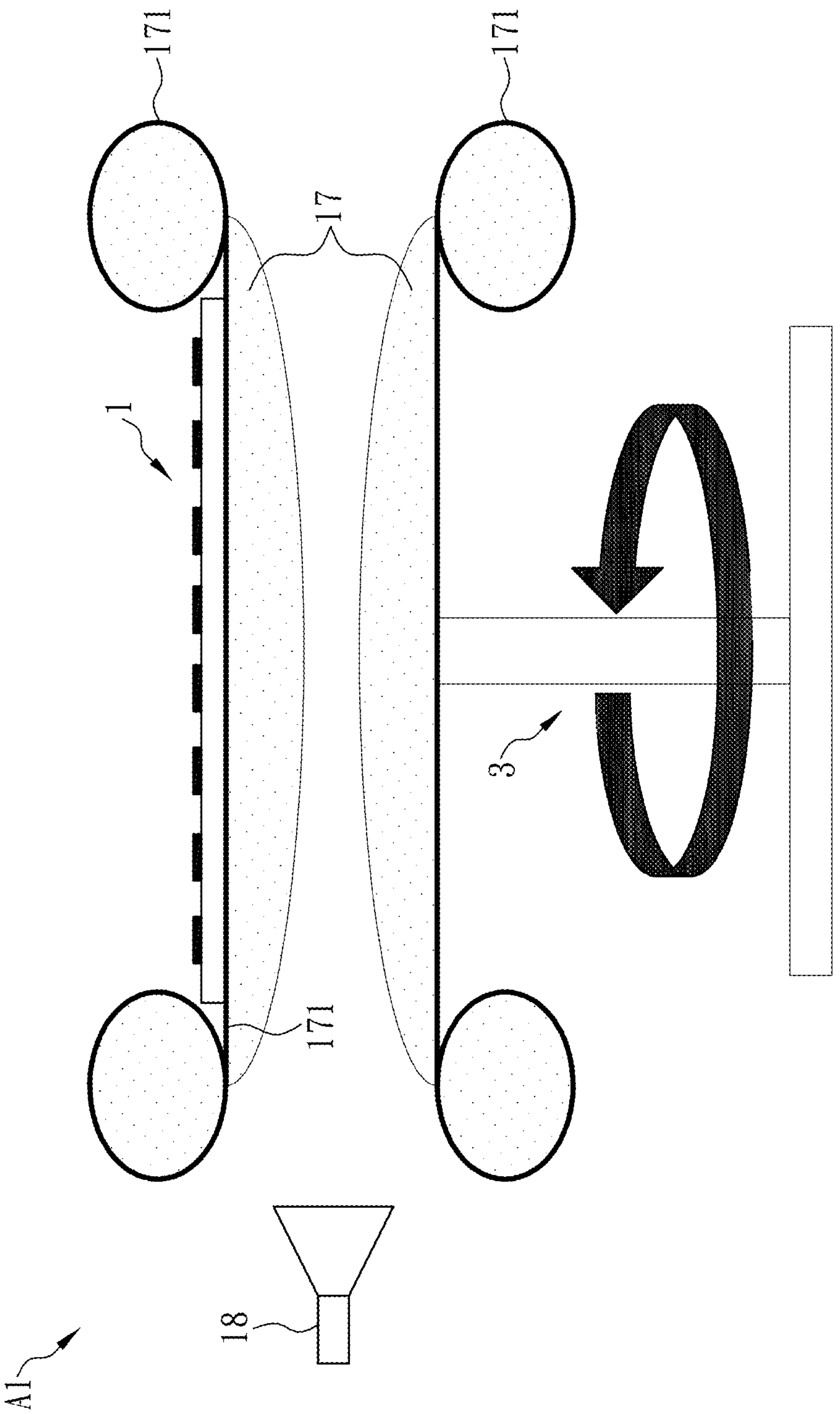
FIG. 7 is a schematic diagram of an antenna device according to certain embodiments of the present disclosure.

To make the antenna device A1 suitable for use in a ground communication (e.g., WIFI, 4G or 5G) system as well as a satellite communication system, referring to FIG. 7 in conjunction with FIG. 6, in certain embodiments, the antenna device A1 is provided with at least one lateral lens module 17 and at least one ground communication antenna module 18 in addition to the structure in FIG. 6. The lateral lens module 17 is located between the antenna module 1 and the rotating portion 3. In certain embodiments, the lateral lens module 17 is made of, for example but not limited to, a plasticized material having a dielectric constant of about 2. In certain embodiments, referring to FIG. 8, a plurality of lateral lens modules 17 can be vertically stacked. When the rotating portion 3 drives the antenna module 1 into rotation, the at least one lateral lens module 17 and the at least one ground communication antenna module 18 are rotated along with the antenna module 1.

Figure 8:
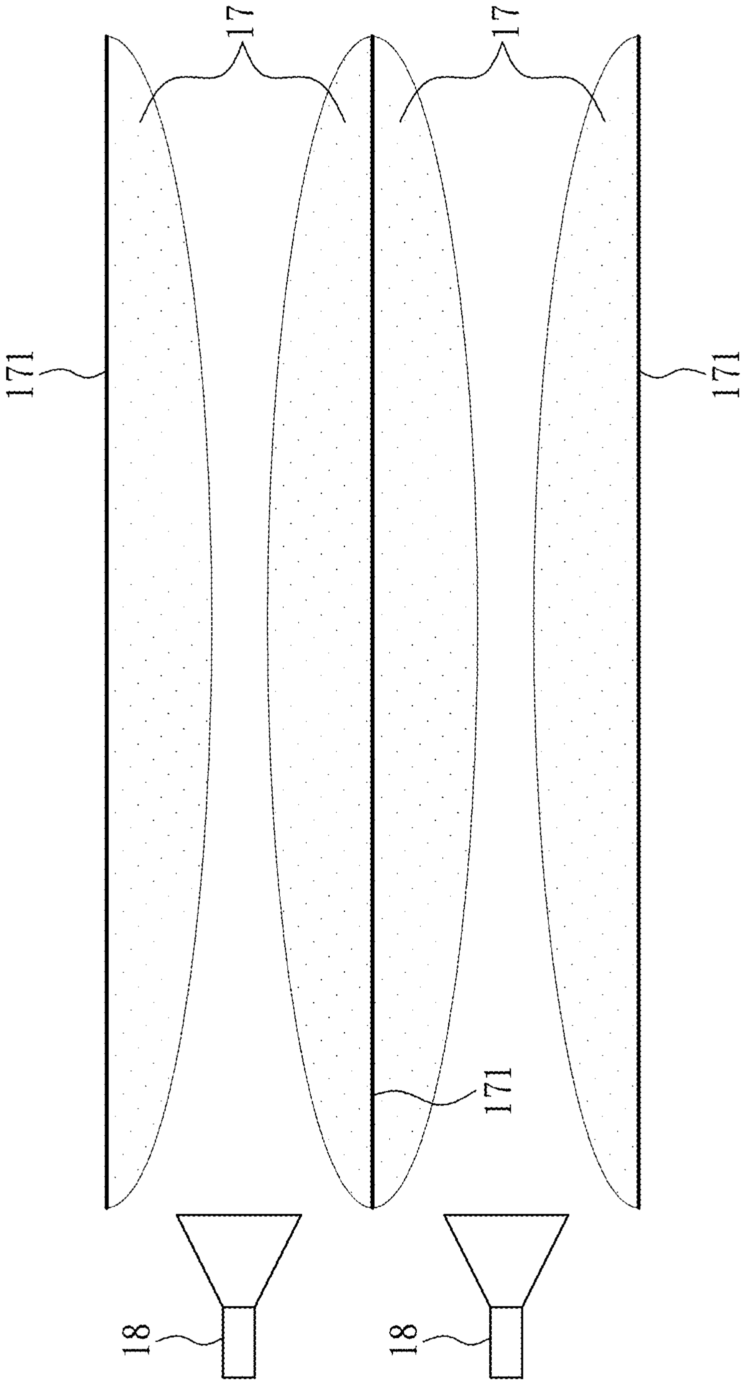
FIG. 8 is a schematic diagram showing a stacking of lateral lens modules according to certain embodiments of the present disclosure.

With continued reference to FIG. 6 to FIG. 8, the ground communication antenna module 18 is located on a lateral side of the lateral lens module 17. In other words, the ground communication antenna module 18 and the lateral lens module 17 are arranged substantially along the XY plane. The ground communication antenna module 18 is designed mainly based on a ground communication (e.g., WIFI, 4G or 5G) protocol and is not suitable for use in satellite communication. The ground communication antenna module 18 is configured to generate RF signals and emit the RF signals toward the lateral lens module 17 in order for the lateral lens module 17 to form a lateral radiation beam, so that the antenna module 1 of the antenna device A1 can track a satellite and carry out satellite communication and can perform ground communication. In certain embodiments, the ground communication antenna module 18 can be a vertical-polarization active antenna in the form of, for example, a horn antenna or a microstrip antenna. Moreover, a metal layer 171 can be disposed between the lateral lens module 17 and the antenna module 1 or between each two adjacent ones of a stack of lateral lens modules 17 to prevent the ground communication antenna module 18 from interfering with the antenna module 1 or another ground communication antenna module 18.

Figure 9:
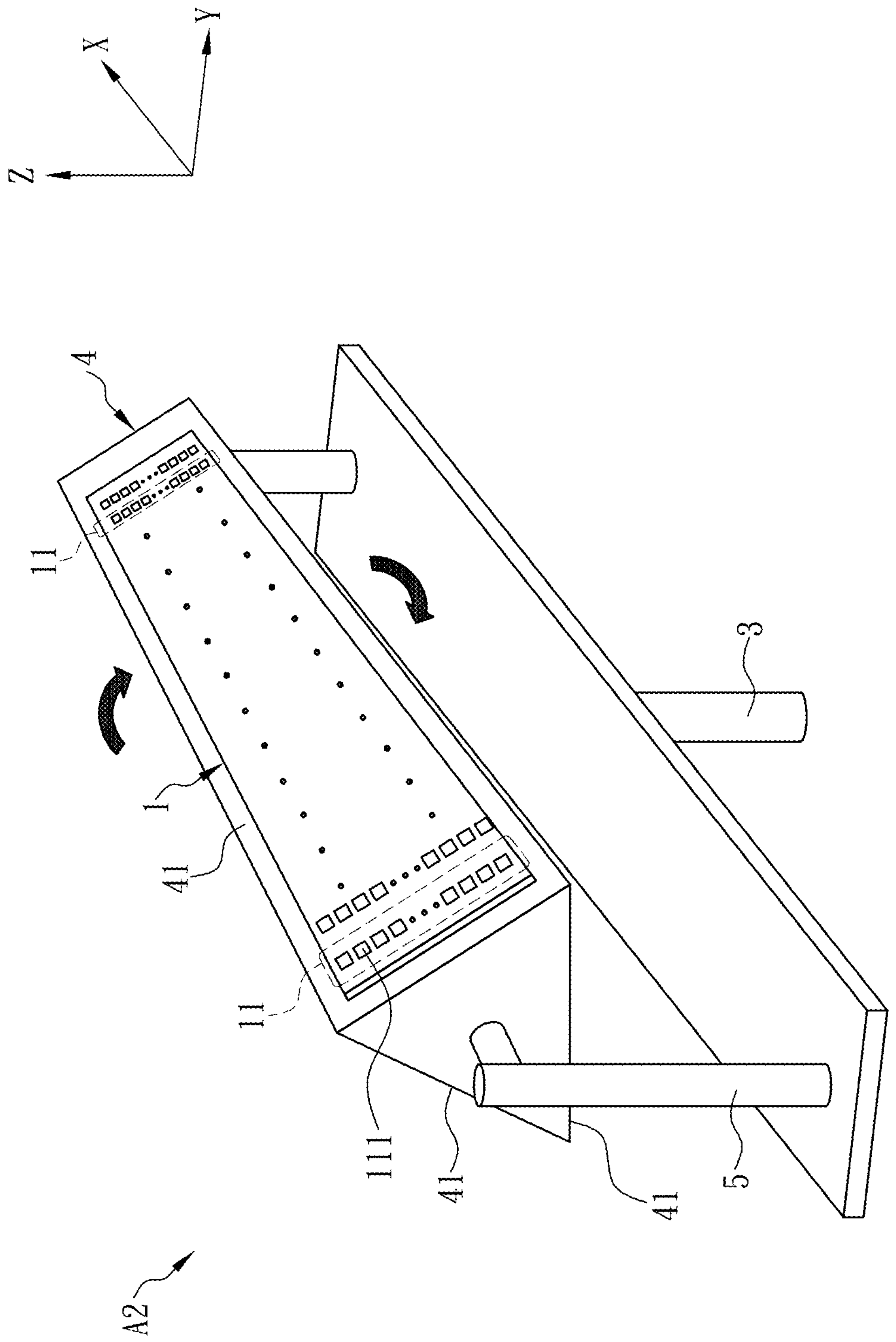
FIG. 9 is a perspective view of an antenna device according to certain embodiments of the present disclosure.
Figure 10:
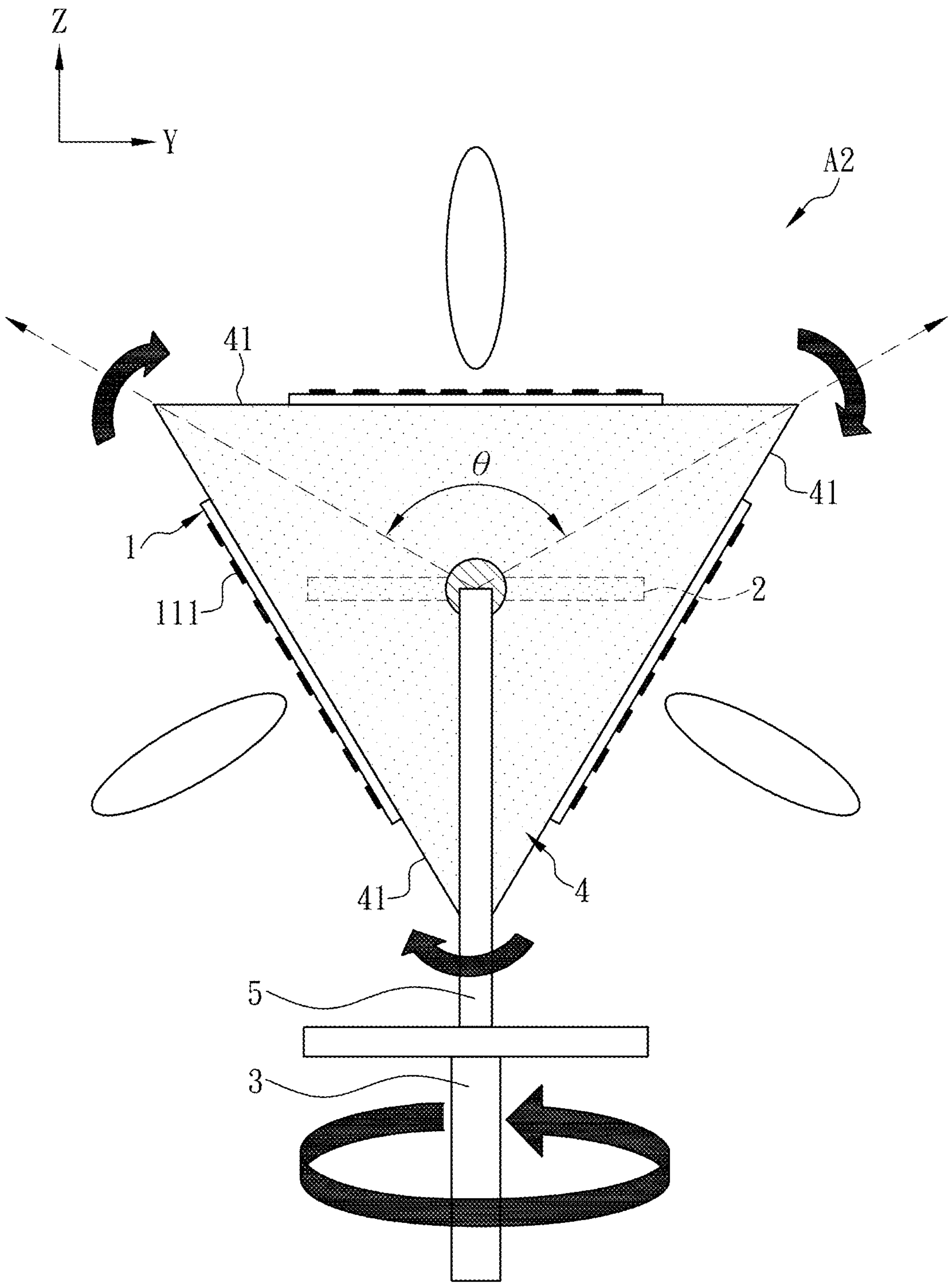
FIG. 10 is a side view of the antenna device according to certain embodiments of the present disclosure.

As the position of the antenna device A1 in certain embodiments can be adjusted by horizontal rotation (i.e., rotation in the XY plane) in order to be aligned with an orbit direction or polarization direction (in particular a linear polarization direction), to prevent frequent alternation between clockwise rotation and counterclockwise rotation of the aforesaid vertical scanning plane from reducing mechanical stability and causing vibrations, in certain embodiments multiple antenna modules that are rotated in a single direction are used. Referring to FIG. 9 and FIG. 10, in certain embodiments, an antenna device A2 includes a plurality of antenna modules 1, a plurality of active RF modules 2, a rotating portion 3, a multiple-sided carrier frame 4, and a pivoting portion 5. The antenna modules 1, the active RF modules 2, and the rotating portion 3 are similar in function and structure to, and therefore are designated by the same reference numerals as, their respective counterparts in certain embodiments described supra, and accordingly for brevity, certain similar structures thereof will not be described repeatedly in detail below.

With continued reference to FIG. 9 and FIG. 10, the multiple-sided carrier frame 4 has a plurality of structural planes 41, and the structural planes 41 are positioned with respect to a central axis in a configuration that the structural planes 41 are distributed around the central axis. The central axis can extend substantially in a first direction (e.g., the X-axis direction). The multiple-sided carrier frame 4 can have three structural planes 41 and forms a three-sided structure. The three-sided structure has a triangular shape in side view (see FIG. 10), with each two adjacent structural planes forming a 60-degree angle therebetween. In certain embodiments, however, the angle between each two adjacent structural planes of the multiple-sided carrier frame 4 can be of any magnitude, and/or the multiple-sided carrier frame 4 can have a different number of structural planes 41. Each structural plane 41 is configured to allow a corresponding antenna module 1 to be mounted thereon and exposed therefrom so that each antenna module 1 can generate a radiation beam with the desired directivity (e.g., a broadside radiation beam). It should be pointed out that, depending on actual product requirements, the antenna device A2 does not necessarily use the same form of the antenna module 1 as in certain embodiments described supra (for example, an array antenna) and can use antenna modules in other forms (e.g., an antenna having a columnar structure) instead. An antenna module 1 can have a substantially flat or substantially curved surface. The antennas on at least two of the structural planes 41 can be of different forms, as long as each antenna module 1 can generate a radiation beam and carry out electronic scanning.

With continued reference to FIG. 9 and FIG. 10, one end of the pivoting portion 5 is disposed at a lateral side of the multiple-sided carrier frame 4 so that the multiple-sided carrier frame 4 can spin around an axis defined by the end of the pivoting portion 5. The end of the pivoting portion 5 extends in the first direction (e.g., the X or Y-axis direction) so that the antenna modules 1 can roll in a vertical plane (e.g., the XZ plane or the YZ plane). Moreover, the electronic scanning capacity of the antenna modules 1 allows the direction of a radiation beam to be adjusted to correct the difference in direction from the orbit of a satellite of interest so that the beam is close to or aligned with the actual position of the satellite. The antenna device A2, therefore, has a mixed beam scanning mechanism that combines electronic scanning and mechanical scanning.

With continued reference to FIG. 9 and FIG. 10, when the multiple-sided carrier frame 4 has W structural planes 41, the range of the beam tracking angle θ of each antenna module 1 is defined as 360/W degrees. For example, in FIG. 10, three structural planes 41 are shown, so the beam tracking angle θ of each antenna module 1 is 120 degrees. When a first beam has completed tracking a satellite, scanning from a first direction to a second direction with its range of beam tracking angle of 360/W degrees, a second beam starts scanning in the first direction in order to track the next satellite. When 360/W is less than 180, the second beam will have an extra angular range and can therefore monitor in advance the area that is about to appear, ensuring the success of linking to the next satellite.

With continued reference to FIG. 9 and FIG. 10, the multiple-sided carrier frame 4 of the antenna device A2 can exemplarily have three structural planes 41, and each structural plane 41 is disposed with an antenna module 1. The antenna modules 1 may be structurally identical or similar to their counterpart in certain embodiments described supra (see FIG. 3). Each antenna module 1 can include M antenna unit groups 11, with M≥1. Each antenna unit group 11 can be regarded as an array unit and can be in the form of a passive antenna. In certain embodiments, the angle of electronic scanning will be reduced because of an increase in satellite density and a decrease in the spacing between orbits. Accordingly, each antenna unit group 11 can include N antenna units 111 (N≥1) according to practical needs. In other words, the antenna unit groups 11 of each antenna module 1 form an array in the horizontal plane (e.g., the XY plane) that works on the principle of an array antenna, and each antenna unit group 11 can be electrically connected (e.g., through a coaxial cable) to an active RF module 2 (e.g., a BFIC) such that the antenna module 1 is equivalent to a one-dimensional active array antenna. Thus, with the active RF modules 2 producing a change in phase, the antenna module 1 can perform electronic scanning in a horizontal plane (i.e., a plane defined by sweeping through an azimuthal angle) to track satellites. The antenna module 1 can also receive the active RF signal(s) transmitted from the active RF modules 2, generate a radiation beam (a fan-shaped radiation beam), and carry out mechanical scanning in a vertical plane (i.e., a plane defined by sweeping through a polar angle) through the design of the pivoting portion 5.

With continued reference to FIG. 9 and FIG. 10, the other end of the pivoting portion 5 is directly or indirectly connected to the first end of the rotating portion 3 so that the pivoting portion 5 can be rotated (i.e., spin or revolve) around an axis defined by the first end of the rotating portion 3, thereby rotating the multiple-sided carrier frame 4 (i.e., making the multiple-sided carrier frame 4 spin or revolve) as a whole to help change the direction of the radiation beam of an antenna module 1 and therefore bring the direction of the radiation beam into alignment with the orbit of a satellite of interest. The multiple-sided carrier frame 4 can be rotated as a whole around a vertical axis (e.g., the Z axis) such that the antenna modules 1 are rotated around the vertical axis (e.g., the Z axis). It should be pointed out that as the antenna modules 1 can also be rolled towards a vertical plane (e.g., the XZ plane or the YZ plane), depending on its position, each antenna module 1 can form various spinning or revolving configurations around the vertical axis (e.g., the Z axis) at different time points. The antenna modules 1 of the antenna device A2 have two independent rotation directions (one of which is around the X or Y axis, and the other of which is around the Z axis) and can perform dual-axis rotation.

Figure 11:
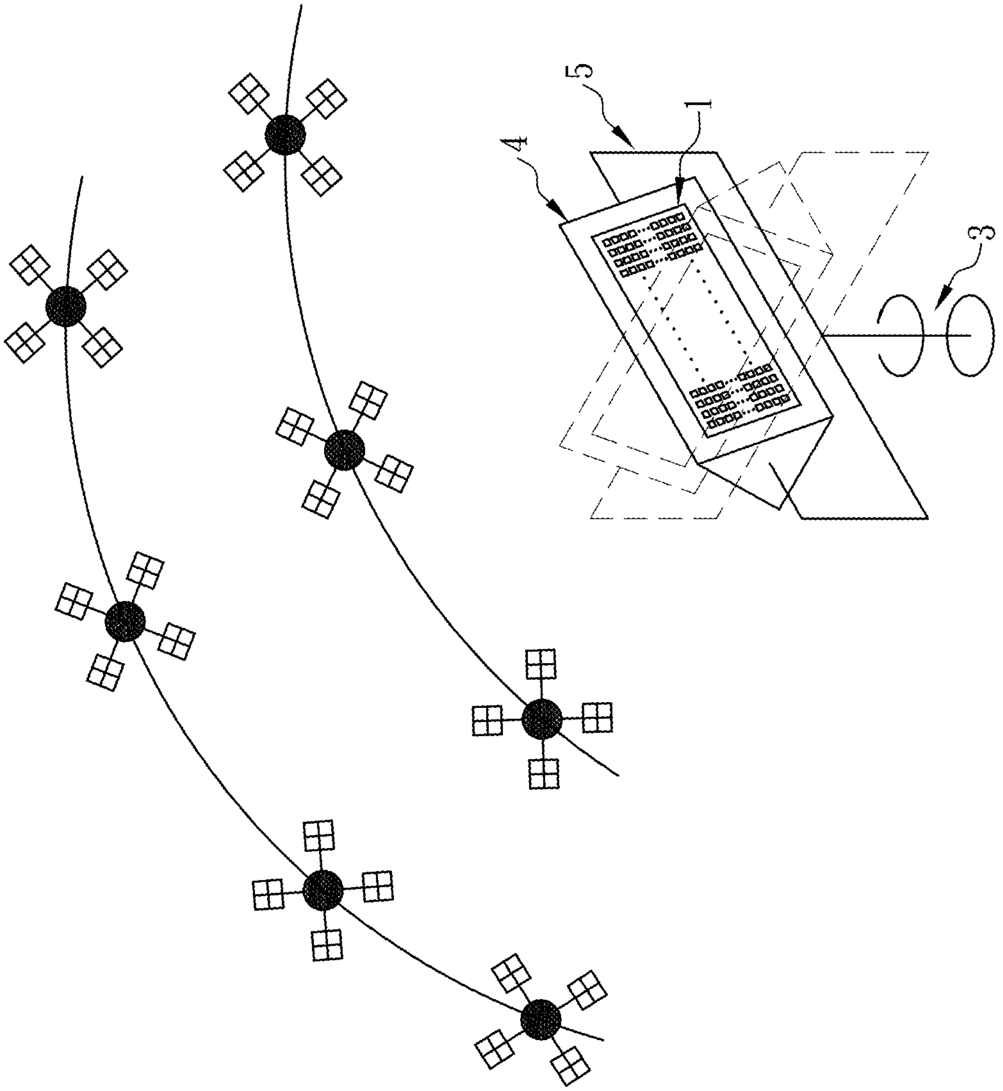
FIG. 11 is a schematic diagram showing the operation of the antenna device according to certain embodiments of the present disclosure.

Referring to FIG. 9 and FIG. 11, satellites fly and revolve around the Earth's center while the antenna device A2 is located on the Earth's surface and rotates around axes defined by itself. Therefore, even if a satellite and the antenna device A2 revolve/rotate at respective constant speeds, the difference between their respective rotation centers causes a difference in their relative speeds with respect to each other; in other words, the flying speed of the satellite with respect to the antenna device A2, which is on the Earth's surface, is not constant. The satellite flies at a higher speed with respect to the antenna device A2 when passing through a position directly above the antenna device A2, and flies at a lower speed with respect to the antenna device A2 when approaching the horizon. Therefore, when the multiple-sided carrier frame 4 of the antenna device A2 is rolled/rotated at a constant speed (based on the speed at which the previous beam tracked a first satellite), the speed at which the next beam is rotated to move will be higher than a satellite moving speed, and this ensures that the second satellite can be caught up with and tracked by the antenna device A2, regardless of whether the second satellite is in the same orbit as, or in a different orbit from, the first satellite. Once the second satellite is caught up with, the antenna device A2 switches the communication link to the second satellite to start the next round of tracking. Besides, the rotating portion 3 can drive the multiple-sided carrier frame 4 into rotation to carry out horizontal position adjustment, so as to align with the direction of the orbit of a satellite of interest, thereby performing the aforesaid rolling satellite-tracking method. Accordingly, the antenna device A2 can link to and track different satellites more flexibly.

Referring again to FIG. 9 and FIG. 10, in certain embodiments, all the antenna modules 1 of the antenna device A2 can be passive antennas, and when the antenna device A2 is in use, it is feasible that only the antenna module 1 on a single structural plane 41 is working at a time. Accordingly, the antenna unit groups 11 on different structural planes 41 can share one group of active RF modules 2. As each antenna unit group 11 of an antenna module 1 requires an active RF module 2, M active RF modules 2 can be arranged on a single independent substrate (e.g., a circuit board) in the form of an array, with each active RF module 2 electrically connected to the corresponding antenna unit groups 11 on the different structural planes 41 through a transmitting-end multi-way switch 43 (see FIG. 12), and no antenna unit group 11 is connected to two different transmitting-end multi-way switches 34, so as to enable selection of the antenna unit group 11 to be used. Similarly, each active RF module 2 can be electrically connected to the corresponding antenna unit groups 11 on the different structural planes 41 through a receiving-end multi-way switch 44 (see FIG. 12), and no antenna unit group 11 is connected to two different receiving-end multi-way switches 44, so as to enable reception of the external RF signal(s) transmitted from the antenna unit group 11 in use. Thus, by sharing the active RF modules 2, the number of the active RF modules 2 required can be greatly reduced, so as to lower the overall cost of the antenna device A2. Moreover, as the components required to control the antenna modules 1 (e.g., microprocessors/microcontrollers and digital control wires) can be disposed on the substrate where the active RF modules 2 are provided, the complexity of circuit design is greatly reduced, too.

Figure 12:
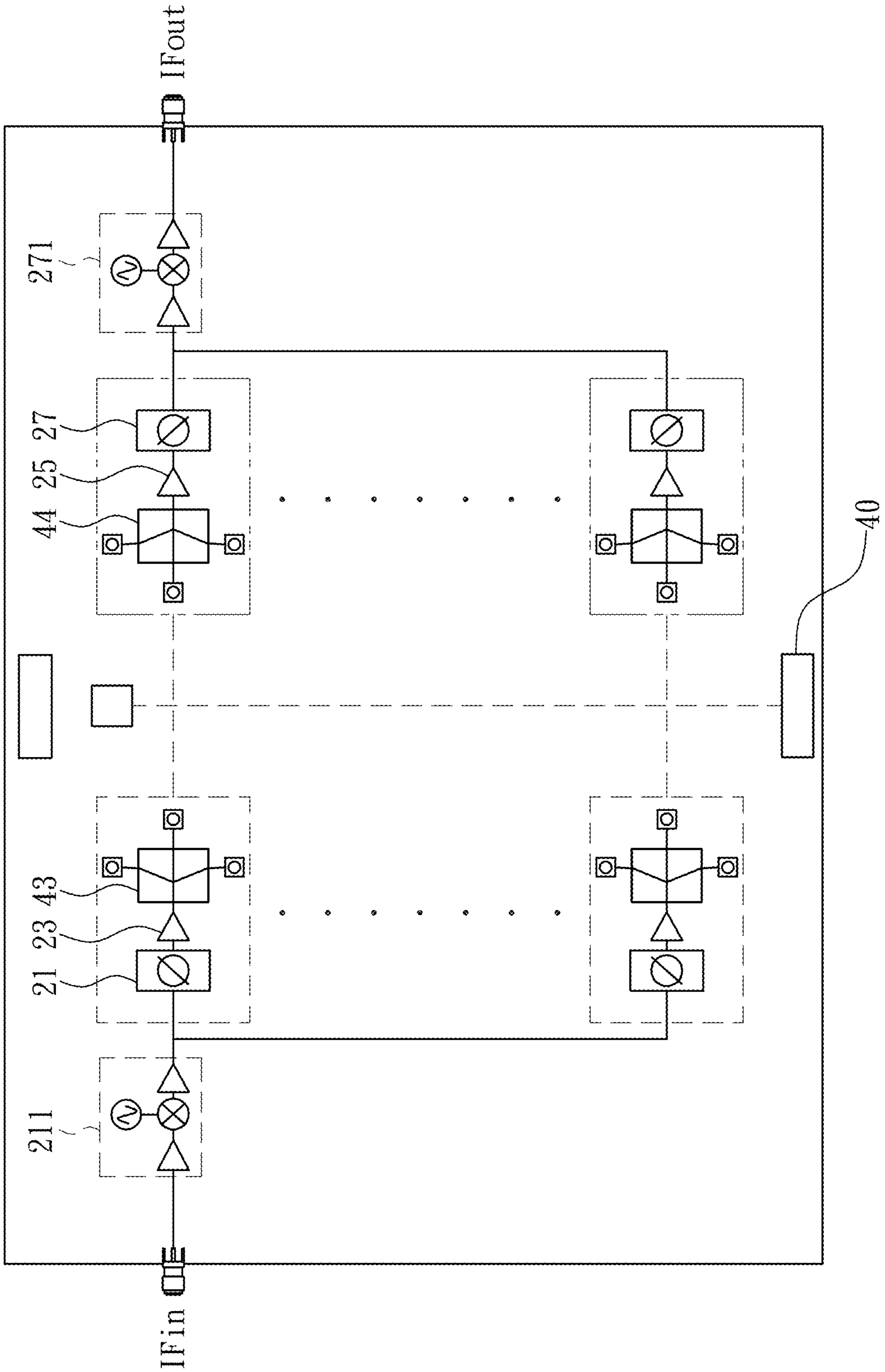
FIG. 12 is a schematic diagram of the circuitry of active RF modules according to certain embodiments of the present disclosure.

In certain embodiments, the connections among the antenna modules 1, the active RF modules 2, the transmitting-end multi-way switches 43, and the receiving-end multi-way switches 44 can be configured as follows. The general structure of each active RF module 2 can be the same as that in certain embodiments described supra, so the components of each active RF module 2 are designated by the same reference numerals as in FIG. 4 and will not be described repeatedly. Referring to FIG. 9 and FIG. 12, each active RF module 2 can include an up-converter module 211 and a down-converter module 271. The up-converter module 211 can be integrated into the corresponding transmitting-end BFIC 21 or be a separate circuit and is configured to convert an intermediate-frequency (IF) signal into an RF signal by increasing the frequency of the former. The down-converter module 271 can be integrated into the corresponding receiving-end BFIC 27 or be a separate circuit and is configured to convert an RF signal into an IF signal by reducing the frequency of the former.

Referring to FIG. 4, FIG. 9 and FIG. 12, the input end of each transmitting-end multi-way switch 43 can be electrically connected to the power amplifier 23 of the corresponding active RF module 2, the output ends of the transmitting-end multi-way switch 43 are electrically connected to the corresponding antenna unit groups 11 on the different structural planes 41, respectively, and in certain embodiments, each of the output ends of each transmitting-end multi-way switch 43 can be electrically connected to the power divider 13 of a corresponding antenna unit group 11. The input ends of each receiving-end multi-way switch 44 can be electrically connected to the corresponding antenna unit groups 11 on the different structural planes 41, respectively, and in certain embodiments, each of the input ends of each receiving-end multi-way switch 44 can be electrically connected to the power combiner 15 of a corresponding antenna unit group 11. The output end of each receiving-end multi-way switch 44 can be electrically connected to the low-noise amplifier 25 of the corresponding active RF module 2. Accordingly, each active RF module 2 can receive an IF input signal IFin and use the corresponding up-converter module 211 to increase the frequency of the IF input signal IFin and thereby convert the IF input signal IFin into an RF signal to be processed by the corresponding transmitting-end BFIC 21, and the corresponding transmitting-end BFIC 21 will process the RF signal by the phase shifter (PS) inside the corresponding transmitting-end BFIC 21 to generate an active RF signal. The active RF signal is transmitted sequentially through the corresponding power amplifier 23 and the corresponding transmitting-end multi-way switch 43 to the corresponding antenna unit group 11 on one of the structural planes 41. Also, when an antenna unit group 11 on one of the structural planes 41 receives external RF signals, the external RF signals will be transmitted sequentially through the corresponding receiving-end multi-way switch 44 and the corresponding low-noise amplifier 25 to the corresponding receiving-end BFIC 27 for further processing, and the resulting RF signal will be reduced in frequency, and thus converted into an IF signal, by the corresponding down-converter module 271, in order for the corresponding active RF module 2 to output an IF output signal IFout. In certain embodiments, however, the antenna device A2 can dispense with the up-converter modules 211 and the down-converter modules 271 and process RF signals directly.

In certain embodiments, with continued reference to FIG. 9 and FIG. 12, all the transmitting-end multi-way switches 43 and/or receiving-end multi-way switches 44 can be controlled by the same control unit 40 in order to work synchronously. Thus, thanks to the switching function of the transmitting-end multi-way switches 43 and/or the receiving-end multi-way switches 44, the multiple antenna modules 1 can share the active RF modules 2 to greatly reduce the number of the active RF modules 2. Moreover, by using a single transmitting-end multi-way switch 43 to switch among the corresponding antenna unit modules 11 on the different structural planes 41, the beam switching time can be substantially shortened to maintain high satellite tracking efficiency. However, the present disclosure is not limited thereto. In certain embodiments, each transmitting-end multi-way switch 43 and/or receiving-end multi-way switch 44 can be provided with an independent control unit 40. In certain embodiments, it is feasible for the antenna modules 1 to not share the active RF modules 2, and to dispense with the transmitting-end multi-way switches 43 and the receiving-end multi-way switches 44, and each antenna module 1 is provided with its own plurality of active RF modules 2.

Figure 13:
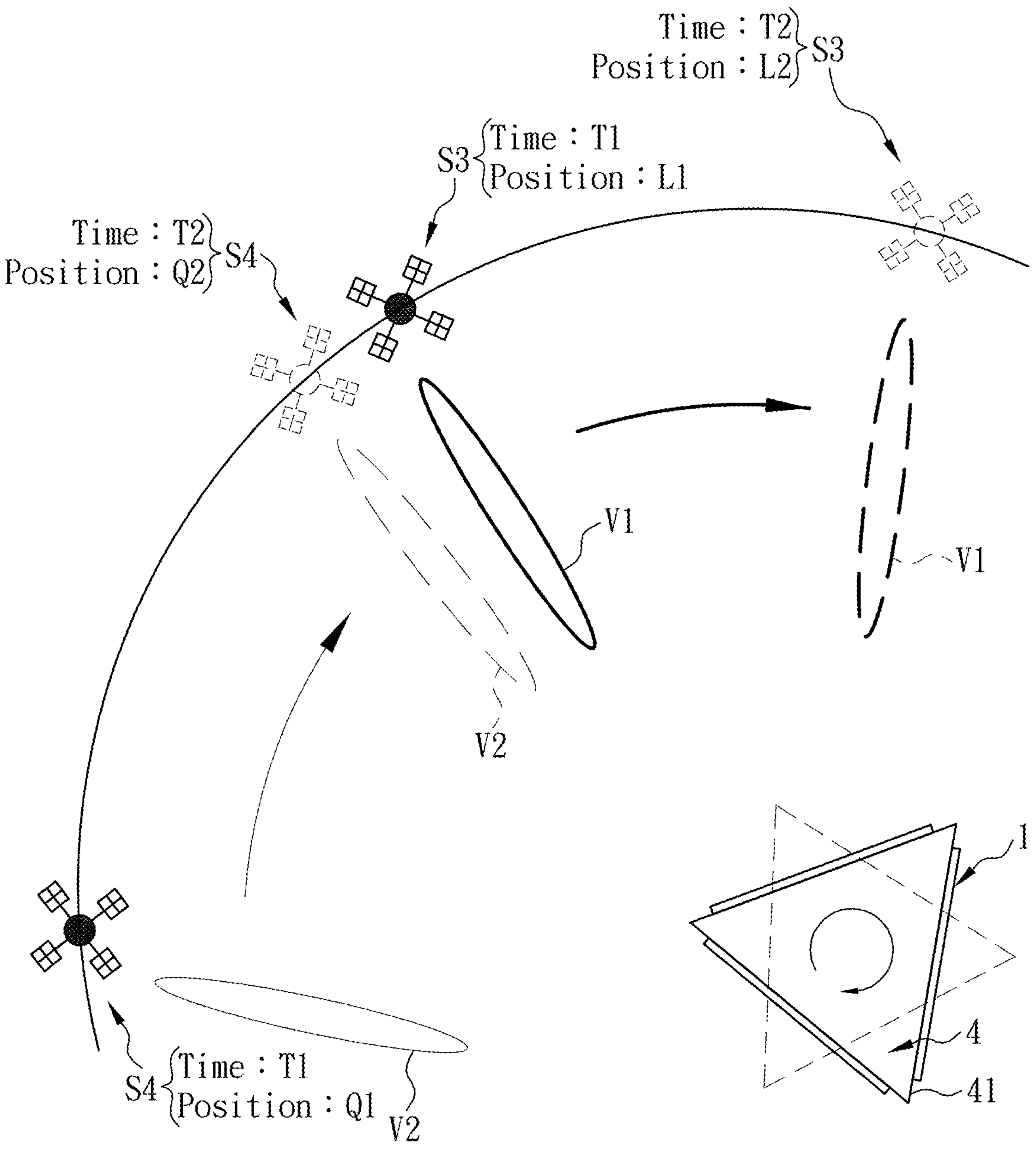
FIG. 13 is a schematic diagram showing the operation of the antenna device tracking satellites according to certain embodiments of the present disclosure.

The way the antenna device A2 tracks satellites is described infra with reference to FIG. 13 in conjunction with FIG. 9. For the sake of clarity, the three antenna modules 1 of the antenna device A2 will be referred to as the first-side antenna module, the second-side antenna module, and the third-side antenna module, and the focused beams generated by the first-side antenna module, the second-side antenna module, and the third-side antenna module are referred to as the first beam V1, the second beam V2, and the third beam respectively. At the first time point T1, the satellites S3 and S4 are located at different first positions L1 and Q1 respectively. At the second time point T2, the satellites S3 and S4 have moved from left to right and arrived at their respective second positions L2 and Q2 respectively. The tracking steps of the antenna device A2 include:

Step P11: The first beam V1 of the first-side antenna module is linked to, and thus used to track, the satellite S3. During the period from the first time point T1 to the second time point T2, the pivoting portion 5 drives the multiple-sided carrier frame 4 into rotation such that the first beam V1 is moved from a position corresponding to the first position L1 to a position corresponding to the second position L2 to ensure that communication with the satellite S3 is not interrupted.

Step P12: The second beam V2 of the second-side antenna module 1 performs the pointing-to and tracking of the satellite S4. During the period from the first time point T1 to the second time point T2, the second beam V2 can be moved from a position corresponding to the first position Q1 to a position corresponding to the second position Q2. As the speed at which the satellite S4 moves is lower than the speed of beam scanning, the second beam V2 can catch up with the satellite S4 with success.

Step P13: The timing of switching between the satellites being tracked:

Step P131: As the satellites S3 and S4 fly and revolve around the Earth's center while the antenna modules 1 are rotated around the axis of the multiple-sided carrier frame 4, the first beam V1 and the second beam V2 would not correspond to the two satellites S3 and S4 precisely, making the first-side antenna module and the second-side antenna module unable to link to the satellites S3 and S4 at the same time. Accordingly, when the second beam V2 catches up with the satellite S4, and starts to link to and communicate with the satellite S4, the first-side antenna module begins to let go of (i.e., stops linking to and tracking) the satellite S3.

Step P132: Once the second beam V2 of the second-side antenna module links to the satellite S4, the first-side antenna module enters a rest mode, and the third beam of the third-side antenna module begins to search for the next satellite to link to. The second-side antenna module can track the satellite S4 to the second position Q2. During the process, the role of the second-side antenna module 1 is equivalent to that played by the first-side antenna module in steps P11-P12, and the role of the third-side antenna module 1 is equivalent to that played by the second-side antenna module in steps P11-P12.

Figure 14:
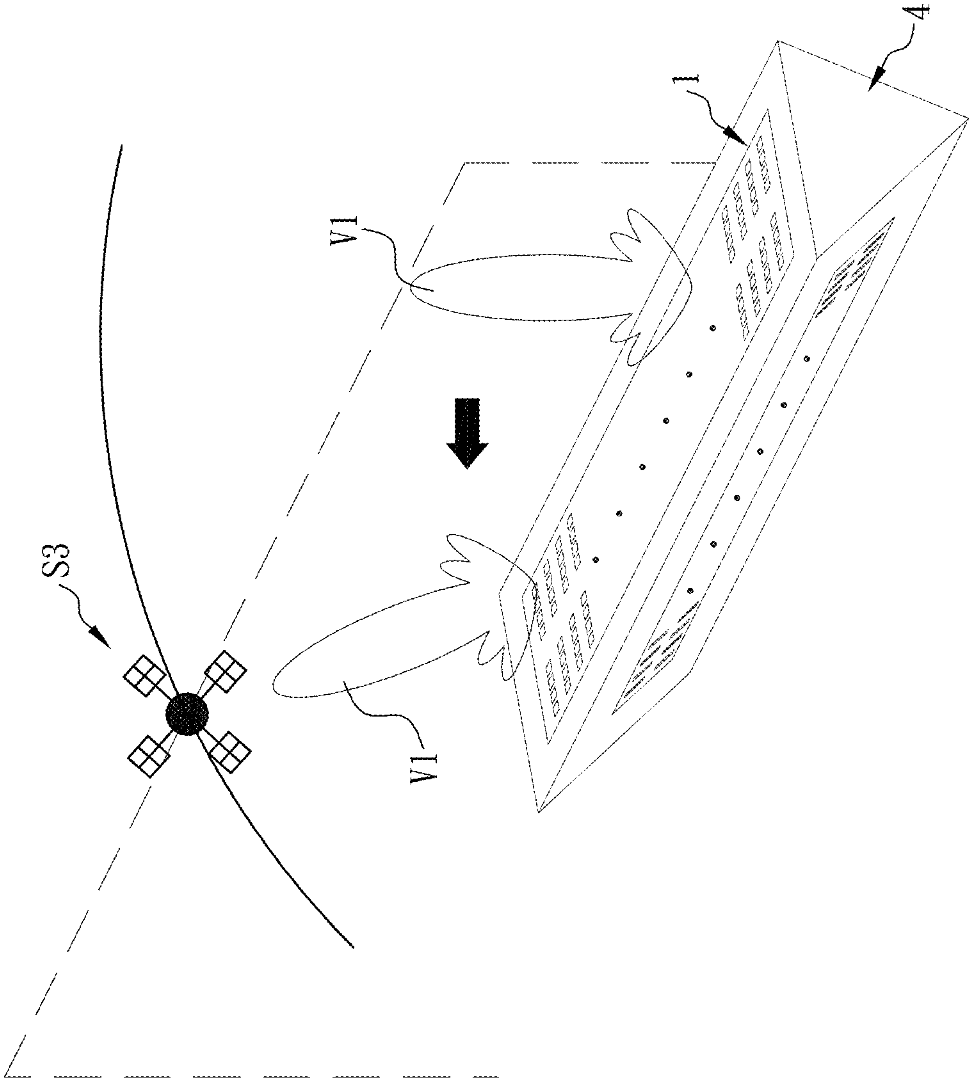
FIG. 14 is a schematic diagram showing the beam shifting of the antenna device according to certain embodiments of the present disclosure.

Step P14: When the first-side/second-side/third-side antenna module 1 deviates from the orbit of a satellite of interest, beam shifting can be carried out. In FIG. 14, for example, the first beam V1 is swiftly turned in a plane perpendicular to the mechanical rotation direction to enable linking to and tracking of the satellite S3. The first-side antenna module forms a scanning plane that extends upward, and the first-side antenna module can adjust the first beam V1 to the orbit plane of the satellite S3 by electronic scanning.

According to the above, referring to FIG. 9 and FIG. 14, in certain embodiments, the antenna device A2 uses electronic scanning mainly to bring a radiation beam into close alignment with the orbit of a satellite to link to so as to link to the satellite, and the scanning angle required is relatively small. In addition, the antenna device A2 can use the rotating portion 3 to perform horizontal position adjustment in a plane defined by sweeping through an azimuthal angle, and use the pivoting portion 5 to enable continuous beam rotation and carry out mechanical scanning in a plane defined by sweeping through a polar angle. Since the mechanical scanning is implemented by physically rotating the antenna modules 1 as a whole without changing the phase of each antenna unit group 11, the gain of the antennas will not be affected. Accordingly, the antenna device A2 not only can prevent gain loss (scan loss) that can otherwise result from scanning with a conventional active array antenna, but also can reduce electromagnetic coupling that can take place between the antenna unit groups 11 during electronic scanning, thereby mitigating interference and saturation.

Figure 15:
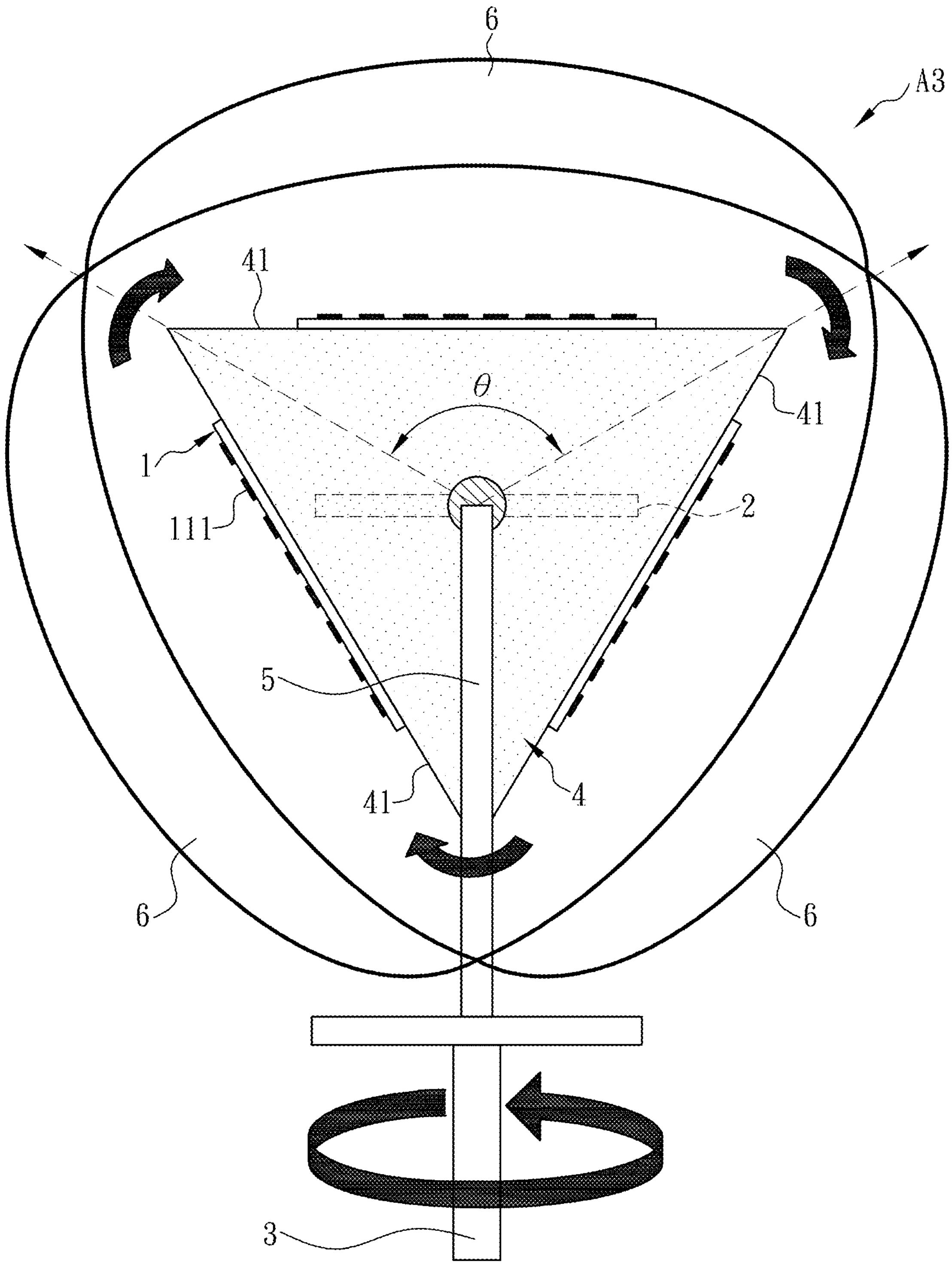
FIG. 15 is a side view of an antenna device according to certain embodiments of the present disclosure.

In certain embodiments, if the number of the antenna units 111 in each antenna unit group 11 of an antenna module 1 is reduced (e.g., $N \leq 3$), the antenna module 1 may have problem focusing effectively, and the resulting radiation beam may have an excessively great width in the second direction (i.e., the direction in which the antenna units 111 are arranged), causing problems such as a reduction in gain, a loss of energy, difficulty in orientation control, and path interference. In certain embodiments, additional lenses can be used to solve these problems. Referring to FIG. 15, an antenna device A3 includes at least one antenna module 1, a plurality of active RF modules 2, a rotating portion 3, a multiple-sided carrier frame 4, a pivoting portion 5, and a plurality of focusing lens modules 6. The at least one antenna module 1, the active RF modules 2, the rotating portion 3, the multiple-sided carrier frame 4, and the pivoting portion 5 can be structurally similar to their respective counterparts in certain embodiments described supra (see FIG. 3 and FIG. 4), and accordingly are designated by the same reference numerals as in certain embodiments described supra, and will not be described in detail below for brevity.

With continued reference to FIG. 15, the focusing lens modules 6 can be located outside the multiple-sided carrier frame 4, with each focusing lens module 6 corresponding to the antenna module 1 on one of the structural planes 41 such that the multiple-sided carrier frame 4 is surrounded by the focusing lens modules 6. The radiation beam generated by each antenna module 1 passes through, and is thus focused by, the corresponding focusing lens module 6 so as to become a focused beam with the desired directivity (e.g., a broadside beam), wherein the focused beam also has high gain and a fan shape (i.e., having a wide-beam configuration in the first direction and a narrow-beam configuration in the second direction). In certain embodiments, the multiple-sided carrier frame 4 can have three sides, and the antenna device A3 has three focusing lens modules 6. The focusing lens modules 6 can be connected together to form an antenna enclosure that encloses the multiple-sided carrier frame 4 and the components thereon, so as to protect the antenna modules 1 from being affected by the external environment. As the antenna modules 1 must maintain their electronic scanning function, the focusing lens modules 6 can have a columnar structure with a circular cross section or an optimized cross section, as long as the focusing lens modules 6 can focus the radiation beams generated by the antenna modules 1 and allow the antenna modules 1 to perform electronic scanning.

Figure 16:
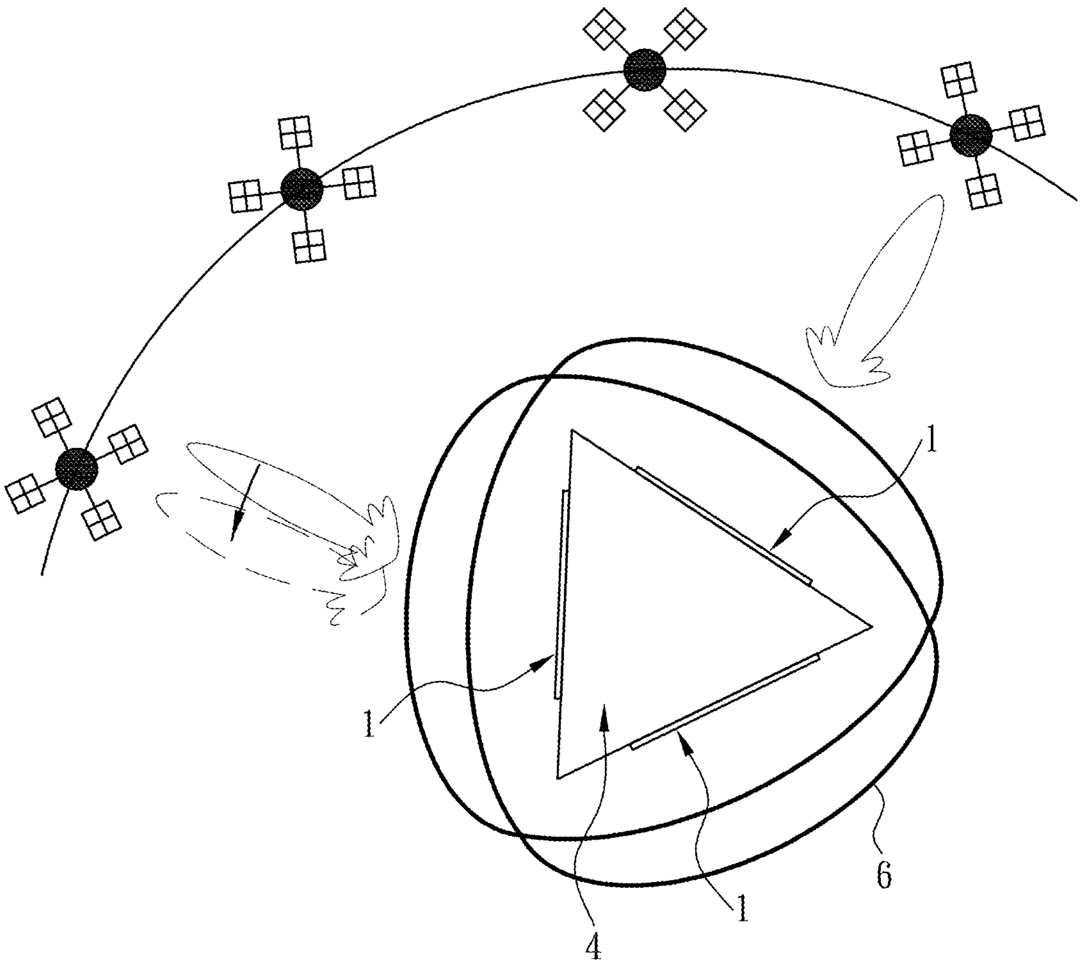
FIG. 16 is a schematic diagram showing the beam shifting of the antenna device according to certain embodiments of the present disclosure.
Figure 17:
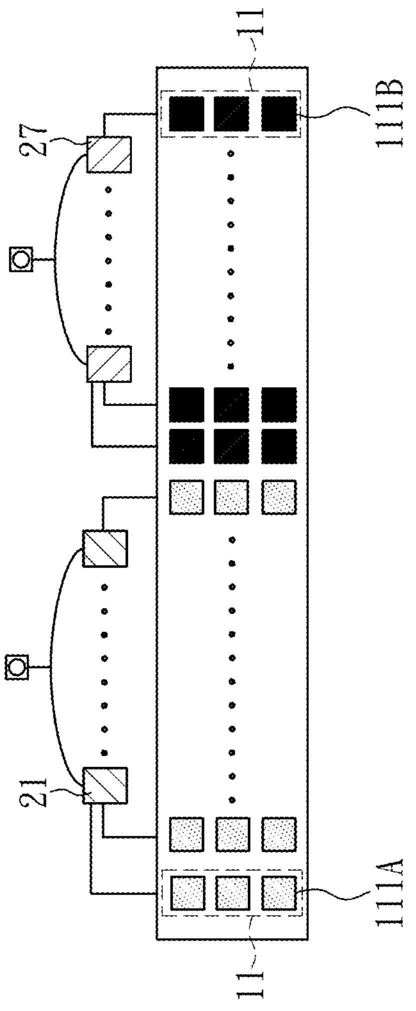
FIG. 17 is a schematic diagram showing the arrangement of antenna units of the antenna device according to certain embodiments of the present disclosure.
Figure 18:
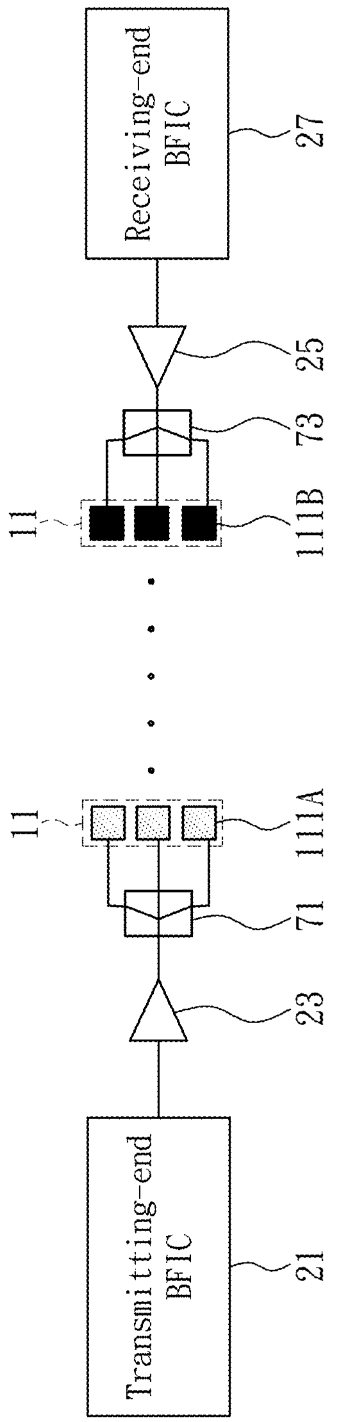
FIG. 18 is a schematic diagram of the circuitry of the antenna module(s) and active RF module(s) according to certain embodiments of the present disclosure.

Referring to FIG. 15 and FIG. 16, when the antenna modules 1 are rotated along with the multiple-sided carrier frame 4, the focused beams generated by the antenna modules 1 are rolled along with the multiple-sided carrier frame 4 too. When the multiple-sided carrier frame 4 is exemplarily a three-sided structure, the positions of each two adjacent ones of the three antenna modules 1 have a fixed angular difference (e.g., 120 degrees). As satellites are discretely distributed along their orbits, with a fixed angular difference (e.g., 5.5 degrees) therebetween, the focused beam used to track a satellite may not correspond exactly in position to the satellite, and in that case, the transmitting and receiving effects will be compromised. As a solution, in certain embodiments, the antenna unit groups 11 of the antenna device A3 can use multiple feeds. Referring to FIG. 17 and FIG. 18, the antenna device A3 has M transmitting-end focus-shifting switches 71 and M receiving-end focus-shifting switches 73, and the transmitting-end antenna units 111A are arranged separately from the receiving-end antenna units 111B such that each antenna unit group 11 includes only transmitting-end antenna units 111A or only receiving-end antenna units 111B. However, the present disclosure is not limited thereto, and the transmitting-end antenna units 111A and the receiving-end antenna units 111B of each antenna module 1 are not necessarily so arranged. The input end of each transmitting-end focus-shifting switch 71 can be electrically connected to one active RF module 2 (e.g., to the power amplifier 23 of the active RF module 2), and each of the multiple output ends of each transmitting-end focus-shifting switch 71 can be electrically connected to one of the multiple antenna units 111 (in particular the transmitting-end antenna units 111A) in the same antenna unit group 11. Each of the multiple input ends of each receiving-end focus-shifting switch 73 can be electrically connected to one of the multiple antenna units 111 (in particular the receiving-end antenna units 111B) in the same antenna unit group 11. The output end of each receiving-end focus-shifting switch 73 can be electrically connected to one active RF module 20 (e.g., to the low-noise amplifier 25 of the active RF module 2). In addition, in the foregoing configuration, the power dividers 13 and the power combiners 15 in FIG. 4 may be dispensed with and replaced by, for example but not limited to, the transmitting-end focus-shifting switches 71 and the receiving-end focus-shifting switches 73.

Referring to FIG. 15 to FIG. 18, through the function of the corresponding transmitting-end focus-shifting switches 71 or receiving-end focus-shifting switches 73, the beam of an antenna module 1 can be shifted by being focused through different positions at the corresponding focusing lens module 6, (e.g., the beam on the left side of FIG. 16 is shifted). Each antenna module 1, therefore, can perform electronic scanning through a small angle (for example but not limited to an angle less than 5 degrees) to compensate for errors caused by unstable floating associated with mechanical scanning. In certain embodiments, each of the multiple antenna units 111 in the same antenna unit group 11 can be connected to an independent active RF module 2 while the transmitting-end focus-shifting switches 71 and the receiving-end focus-shifting switches 73 are dispensed with, so as to perform dynamic focusing and more precise beam shifting. Such a configuration is also a multiple-feed configuration. In certain embodiments, each antenna module 1 can use the same connections as in certain embodiments described supra, i.e., in each antenna unit group 11, all the antenna units 111 are electrically connected to one active RF module 2 (and without using any transmitting-end focus-shifting switch 71 or receiving-end focus-shifting switch 73). Such a configuration is a single-feed configuration.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna device for mixed beam scanning, comprising:

at least one antenna module configured to perform electronic scanning in a one-dimensional direction, and comprising:

a plurality of antenna unit groups arranged along a first direction, each comprising at least one antenna unit, wherein the at least one antenna unit of the same antenna unit group is arranged along a second direction;

a plurality of active radio-frequency (RF) modules electrically connected to the plurality of antenna unit groups, respectively, each configured to generate an active RF signal and transmit the active RF signal to a corresponding one of the plurality of antenna unit groups, so that the corresponding antenna unit group forms a radiation beam based on the active RF signal, wherein each of the plurality of antenna unit groups is configured to receive at least one external RF signal and transmit the at least one external RF signal to a corresponding one of the plurality of active RF modules;

a rotating portion having one end directly or indirectly connected to the at least one antenna module and configured to drive the at least one antenna module to spin or revolve around the end of the rotating portion to compensate or enhance a scanning capacity of the at least one antenna module in another dimension;

at least one lateral lens module located between the at least one antenna module and the rotating portion; and at least one ground communication antenna module located on a lateral side of the at least one lateral lens module and configured to emit at least one RF signal toward the at least one lateral lens module so that the at least one lateral lens module forms a lateral radiation beam, wherein a metal layer is disposed between the at least one lateral lens module and the at least one antenna module or between each two adjacent ones of a stack of lateral lens modules.

2. The antenna device according to claim 1, wherein the rotating portion is configured to drive the at least one antenna module to rotate alternate between clockwise rotation and counterclockwise rotation.

3. The antenna device according to claim 1, further comprising a position adjusting portion having a first end directly or indirectly connected to the at least one antenna module and a second end directly or indirectly connected to the rotating portion, and configured to tilt the at least one antenna module around an axis defined by the first end of the position adjusting portion to enhance a scanning ability of the at least one antenna module in a one-dimensional direction.

4. The antenna device according to claim 1, wherein the ground communication antenna module uses WIFI, 4G or 5G communication protocol.

5. The antenna device according to claim 1, wherein the ground communication antenna module is in a form of a horn antenna or a microstrip antenna.

6. The antenna device according to claim 1, further comprising:

a multiple-sided carrier frame having a plurality of structural planes, wherein each of the plurality of structural planes is positioned with respect to a central axis in a configuration that the plurality of structural planes are distributed around the central axis, and the at least one antenna module comprises a plurality of antenna modules, and each of the plurality of structural planes is configured to allow a corresponding one of the plurality of antenna modules to be mounted thereon; and a pivoting portion having:

a first end disposed at a lateral side of the multiple-sided carrier frame, wherein the multiple-sided carrier frame is configured to spin around an axis defined by the first end of the pivoting portion; and a second end directly or indirectly connected to the end of the rotating portion, wherein the first end of the pivoting portion extends along a first extending direction, the end of the rotating portion extends along a second extending direction, and the second extending direction is substantially perpendicular to the first extending direction, so that a rotating direction of the at least one antenna module driven by the rotating portion is different from a spinning direction of the multiple-sided carrier frame.

7. The antenna device according to claim 6, further comprising a plurality of transmitting-end multi-way switches and a plurality of receiving-end multi-way switches, wherein each of the plurality of transmitting-end multi-way switches is electrically connected to antenna unit groups on different ones of the plurality of structural planes and to one of the plurality of active RF modules, antenna unit groups on the same one of the plurality of structural planes are not electrically connected to the same one of the plurality of transmitting-end multi-way switches, each of the plurality of receiving-end multi-way switches is electrically connected to antenna unit groups on different ones of the plurality of structural planes and to one of the plurality of active RF modules, and antenna unit groups on the same one of the plurality of structural planes are not electrically connected to the same one of the plurality of receiving-end multi-way switches.

8. The antenna device according to claim 6, wherein the multiple-sided carrier frame has three structural planes and forms a three-sided structure, and the three-sided structure has a triangular shape in a side view.

9. The antenna device according to claim 8, wherein each two adjacent ones of the three structural planes form a 60-degree angle therebetween.

10. The antenna device according to claim 6, further comprising a plurality of focusing lens modules, each located outside the multiple-sided carrier frame, corresponding to one of the plurality of antenna modules and configured to focus a radiation beam generated by the antenna module.

11. The antenna device according to claim 1, wherein each of the plurality of antenna unit groups comprises a plurality of antenna units electrically connected to a transmitting-end focus-shifting switch and to a receiving-end focus-shifting switch, the transmitting-end focus-shifting switch is electrically connected to one of the plurality of active RF modules, and the receiving-end focus-shifting switch is electrically connected to one of the plurality of active RF modules.

12. The antenna device according to claim 1, wherein each of the plurality of active RF modules comprises:

a transmitting-end beam-forming integrated circuit (BFIC) configured to generate an active RF signal;

a power amplifier electrically connected to the transmitting-end BFIC and configured to receive the active RF signal from the transmitting-end BFIC, amplify a power of the active RF signal received from the transmitting-end BFIC, and directly or indirectly transmit the amplified active RF signal to the corresponding antenna unit group;

a low-noise amplifier configured to directly or indirectly receive at least one external RF signal transmitted by the corresponding antenna unit group and amplify the at least one external RF signal; and a receiving-end BFIC electrically connected to the low-noise amplifier and configured to receive the amplified at least one external RF signal.

13. The antenna device according to claim 12, wherein each of the plurality of antenna unit groups comprises:

a plurality of antenna units;

a power divider electrically connected to the power amplifier and the plurality of antenna units and configured to distribute the amplified active RF signal among the plurality of antenna units; and a power combiner electrically connected to the low-noise amplifier and the plurality of antenna units and configured to combine external RF signals sent by the plurality of antenna units.

14. The antenna device according to claim 12, wherein the at least one antenna module is divided into a first satellite area and a second satellite area, each antenna unit group in the first satellite area is connected to a higher-power power amplifier, each antenna unit group in the second satellite area is connected to a lower-power power amplifier, and a power level the higher-power power amplifier is configured to amplify to is higher than a power level the lower-power power amplifier is configured to amplify to.

15. An antenna device for mixed beam scanning, comprising:

a multiple-sided carrier frame having a plurality of structural planes, wherein each of the plurality of structural planes is positioned with respect to a central axis in a configuration that the plurality of structural planes are distributed around the central axis;

a plurality of antenna modules, each configured to be mounted on and exposed from a corresponding one of the plurality of structural planes and perform electronic scanning in a one-dimensional direction;

a plurality of active radio-frequency (RF) modules, each electrically connected to the plurality of antenna modules and configured to generate an active RF signal and transmit the active RF signal to a corresponding one of the plurality of antenna modules, so that the antenna module forms a radiation beam based on the active RF signal, wherein each of the plurality of antenna modules is configured to receive at least one external RF signal and transmit the at least one external RF signal to a corresponding one of the plurality of active RF modules;

a pivoting portion having a first end disposed at a lateral side of the multiple-sided carrier frame and extending along a first extending direction, wherein the multiple-sided carrier frame is configured to spin around an axis defined by the first end of the pivoting portion; and a rotating portion having an end directly or indirectly connected to a second end of the pivoting portion, extending along a second extending direction substantially perpendicular to the first extending direction, and configured to drive the multiple-sided carrier frame to spin or revolve around an axis of the rotating portion to compensate or enhance a scanning capacity of the plurality of antenna modules in another dimension, and drive the plurality of antenna modules to rotate as a whole along a rotating direction different from a spinning direction of the multiple-sided carrier frame.

16. The antenna device according to claim 15, wherein each of the plurality of antenna modules comprises a plurality of antenna unit groups arranged along a first direction, and each of the plurality of antenna unit groups is electrically connected to a corresponding one of the plurality of active RF modules and comprises at least one antenna unit, wherein the at least one antenna unit of the same antenna unit group is arranged along a second direction.

17. The antenna device according to claim 16, further comprising a plurality of transmitting-end multi-way switches and a plurality of receiving-end multi-way switches, wherein each of the plurality of transmitting-end multi-way switches is electrically connected to antenna unit groups on different ones of the plurality of structural planes and to one of the plurality of active RF modules, antenna unit groups on the same one of the plurality of structural planes are not electrically connected to the same one of the plurality of transmitting-end multi-way switches, each of the plurality of receiving-end multi-way switches is electrically connected to antenna unit groups on different ones of the plurality of structural planes and to one of the plurality of active RF modules, and antenna unit groups on the same one of the plurality of structural planes are not electrically connected to the same one of the plurality of receiving-end multi-way switches.

18. The antenna device according to claim 15, wherein the multiple-sided carrier frame has three structural planes and forms a three-sided structure, and the three-sided structure has a triangular shape in a side view.

19. The antenna device according to claim 18, wherein each two adjacent ones of the three structural planes form a 60-degree angle therebetween.

20. The antenna device according to claim 15, further comprising a plurality of focusing lens modules, each located outside the multiple-sided carrier frame, corresponding to one of the plurality of antenna modules and configured to focus the radiation beam generated by the antenna module corresponding to the focusing lens module.

21. The antenna device according to claim 20, wherein each of the plurality of antenna modules comprises a plurality of antenna unit groups arranged along a first direction, each of the plurality of antenna unit groups is electrically connected to a corresponding one of the plurality of active RF modules, and comprises a plurality of antenna units arranged along a second direction and electrically connected to a transmitting-end focus-shifting switch and to a receiving-end focus-shifting switch, the transmitting-end focus-shifting switch is electrically connected to one of the plurality of active RF modules, and the receiving-end focus-shifting switch is electrically connected to one of the plurality of active RF modules.

22. The antenna device according to claim 16, wherein each of the plurality of active RF modules comprises:

a transmitting-end beam-forming integrated circuit (BFIC) configured to generate an active RF signal;

a power amplifier electrically connected to the transmitting-end BFIC and configured to receive the active RF signal from the transmitting-end BFIC, amplify a power of the active RF signal received from the transmitting-end BFIC, and directly or indirectly transmit the amplified active RF signal to a corresponding one of the plurality of antenna unit groups;

a low-noise amplifier configured to directly or indirectly receive at least one external RF signal transmitted by the corresponding antenna unit group and amplify the at least one external RF signal; and a receiving-end BFIC electrically connected to the low-noise amplifier and configured to receive the amplified at least one external RF signal.

23. The antenna device according to claim 22, wherein each of the plurality of antenna unit groups comprises:

a plurality of antenna units;

a power divider electrically connected to the power amplifier and the plurality of antenna units and configured to distribute the amplified active RF signal among the plurality of antenna units; and a power combiner electrically connected to the low-noise amplifier and the plurality of antenna units and configured to combine external RF signals sent by the plurality of antenna units.

24. An antenna device for mixed beam scanning, comprising:

at least one antenna module configured to perform electronic scanning in a one-dimensional direction, and comprising:

a plurality of antenna unit groups arranged along a first direction, each comprising at least one antenna unit, wherein the at least one antenna unit of the same antenna unit group is arranged along a second direction;

a plurality of active radio-frequency (RF) modules electrically connected to the plurality of antenna unit groups, respectively, each configured to generate an active RF signal and transmit the active RF signal to a corresponding one of the plurality of antenna unit groups, so that the corresponding antenna unit group forms a radiation beam based on the active RF signal, wherein each of the plurality of antenna unit groups is configured to receive at least one external RF signal and transmit the at least one external RF signal to a corresponding one of the plurality of active RF modules;

a rotating portion having one end directly or indirectly connected to the at least one antenna module and configured to drive the at least one antenna module to spin or revolve around the end of the rotating portion to compensate or enhance a scanning capacity of the at least one antenna module in another dimension;

a multiple-sided carrier frame having a plurality of structural planes, wherein each of the plurality of structural planes is positioned with respect to a central axis in a configuration that the plurality of structural planes are distributed around the central axis, and the at least one antenna module comprises a plurality of antenna modules, and each of the plurality of structural planes is configured to allow a corresponding one of the plurality of antenna modules to be mounted thereon; and a pivoting portion having:

a first end disposed at a lateral side of the multiple-sided carrier frame, wherein the multiple-sided carrier frame is configured to spin around an axis defined by the first end of the pivoting portion; and a second end directly or indirectly connected to the end of the rotating portion, wherein the first end of the pivoting portion extends along a first extending direction, the end of the rotating portion extends along a second extending direction, and the second extending direction is substantially perpendicular to the first extending direction, so that a rotating direction of the at least one antenna module driven by the rotating portion is different from a spinning direction of the multiple-sided carrier frame.

25. The antenna device according to claim 24, further comprising a plurality of transmitting-end multi-way switches and a plurality of receiving-end multi-way switches, wherein each of the plurality of transmitting-end multi-way switches is electrically connected to antenna unit groups on different ones of the plurality of structural planes and to one of the plurality of active RF modules, antenna unit groups on the same one of the plurality of structural planes are not electrically connected to the same one of the plurality of transmitting-end multi-way switches, each of the plurality of receiving-end multi-way switches is electrically connected to antenna unit groups on different ones of the plurality of structural planes and to one of the plurality of active RF modules, and antenna unit groups on the same one of the plurality of structural planes are not electrically connected to the same one of the plurality of receiving-end multi-way switches.

* * * * *